US012786163B2

(12) United States Patent
Touboul

(10) Patent No.: US 12,786,163 B2
(45) **Date of Patent: *Nov. 3, 2026**

(54) SYSTEM AND METHOD FOR IMPLEMENTING CONTENT AND NETWORK SECURITY INSIDE A CHIP

(71) Applicant: CUPP Computing AS, Oslo (NO)

(72) Inventor: Shlomo Touboul, Kefar Haim (IL)

(73) Assignee: CUPP Computing AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 19/011,878

(22) Filed: Jan. 7, 2025

(65) Prior Publication Data

US 2025/0392567 A1 Dec. 25, 2025

Related U.S. Application Data

(63) Continuation of application No. 18/242,795, filed on Sep. 6, 2023, now Pat. No. 12,192,170, which is a (Continued)

(51) Int. Cl.

*H04L 9/00* (2022.01)
*G06F 21/57* (2013.01)

(Continued)

(52) U.S. Cl.

CPC .......... *H04L 63/0209* (2013.01); *G06F 21/57* (2013.01); *H04W 12/12* (2013.01);

(Continued)

(58) Field of Classification Search

CPC ... H04W 12/08; H04W 12/12; H04W 12/128; H04L 63/0227; H04L 63/0209; G06F 2221/034; G06F 21/57

(Continued)

(56) References Cited

U.S. PATENT DOCUMENTS

| | | | |
|---|---|---|---|
| H1944 | H | 2/2001 | Cheswick |
| 6,286,087 | B1 | 9/2001 | Ito |

(Continued)

FOREIGN PATENT DOCUMENTS

| | | |
|---|---|---|
| WO | 2000078008 | 12/2000 |
| WO | 2004030308 | 4/2004 |

(Continued)

OTHER PUBLICATIONS

Breeden II, John et al., "A Hardware Firewall You Will Take With You," Government Computer News, located at https://gcn.com/Articles/2005/06/01/A-hardware-firewall-you-take-with-you.aspx?p=1, Jun. 1, 2005.

(Continued)

*Primary Examiner* — Josnel Jeudy

(74) *Attorney, Agent, or Firm* — Sheppard Mullin Richter & Hampton LLP

(57) ABSTRACT

Systems and methods for implementing content, streaming, and network security inside a chip or inside a computing device are disclosed. In exemplary embodiments, a system comprises a communication chip and a second processor. The communication chip comprises a router and security instructions. The router is configured to intercept untrusted data between a network, and a first router. The second processor is configured to receive the untrusted data from the router, process the untrusted data with the security instructions to produce trusted data, and provide the trusted data to the router.

14 Claims, 17 Drawing Sheets

Related U.S. Application Data continuation of application No. 17/362,412, filed on Jun. 29, 2021, now Pat. No. 11,757,835, which is a continuation of application No. 16/389,886, filed on Apr. 19, 2019, now Pat. No. 11,050,712, which is a continuation of application No. 14/520,314, filed on Oct. 21, 2014, now Pat. No. 10,541,969, which is a continuation of application No. 12/402,443, filed on Mar. 11, 2009, now Pat. No. 8,869,270.

(60) Provisional application No. 61/039,729, filed on Mar. 26, 2008.

(51) Int. Cl.
*H04L 9/40* (2022.01)
*H04W 12/12* (2021.01)
*H04W 12/128* (2021.01)
*H04W 12/08* (2021.01)

(52) U.S. Cl.
CPC ..... *H04W 12/128* (2021.01); *G06F 2221/034* (2013.01); *H04L 63/0227* (2013.01); *H04W 12/08* (2013.01)

(58) Field of Classification Search
USPC .......................................................... 726/22
See application file for complete search history.

(56) References Cited

U.S. PATENT DOCUMENTS 6,466,779 B1 10/2002 Moles
6,725,294 B1 4/2004 Moore et al.
6,772,345 B1 8/2004 Shetty
6,813,682 B2 11/2004 Bress
7,036,143 B1 4/2006 Leung
7,065,644 B2 6/2006 Daniell
7,069,330 B1 6/2006 McArdle
7,076,690 B1 7/2006 Todd
7,086,089 B2 8/2006 Hrastar
7,131,141 B1 10/2006 Blewett
7,168,089 B2 1/2007 Nguyen
D537,036 S 2/2007 Chen
7,184,554 B2 2/2007 Freese
7,197,638 B1 3/2007 Grawrock
7,283,542 B2 10/2007 Mitchell
7,353,533 B2 4/2008 Wright
7,359,983 B1 4/2008 Maufer
7,360,242 B2 4/2008 Syvanne
7,418,253 B2 8/2008 Kavanagh
7,529,932 B1 5/2009 Haustein
7,539,828 B2 5/2009 Lomnes
7,657,941 B1 2/2010 Zaitsev
7,665,137 B1 2/2010 Barton
7,818,803 B2 10/2010 Gordon
7,894,480 B1 2/2011 Wang et al.
7,908,476 B2 3/2011 Kandasamy
7,921,303 B2 * 4/2011 Mauro .................... G06F 21/79 713/193
7,971,258 B1 6/2011 Liao et al.
7,984,479 B2 7/2011 Brabson
7,992,199 B1 8/2011 Winick
8,145,733 B1 3/2012 Cheng et al.
8,180,654 B2 5/2012 Berkman
8,218,449 B2 7/2012 Taylor
8,218,558 B2 7/2012 Tan
8,234,261 B2 7/2012 Monahan
8,239,531 B1 8/2012 Bellovin
8,266,670 B1 9/2012 Merkow
8,321,934 B1 11/2012 Cooley
8,365,272 B2 1/2013 Touboul
8,402,528 B1 3/2013 McCorkendale
8,474,021 B2 * 6/2013 Hearn ................... G06F 21/575 171/82
8,495,290 B2 7/2013 Sugar et al.
8,495,700 B2 7/2013 Shahbazi
8,631,488 B2 1/2014 Oz
8,745,409 B2 * 6/2014 Teicher ................... G06F 21/78 713/192
RE45,009 E 7/2014 Vange et al.
8,789,202 B2 7/2014 Touboul et al.
8,904,523 B2 12/2014 Gordon
8,978,132 B2 3/2015 Henry
9,202,070 B2 12/2015 Rajakarunanayake et al.
9,332,028 B2 5/2016 Xaypanya et al.
9,438,631 B2 9/2016 Bettini
9,565,202 B1 2/2017 Kindlund
9,747,444 B1 8/2017 Touboul
9,762,614 B2 9/2017 Ely
9,832,603 B2 11/2017 Schlaupitz
9,847,020 B2 12/2017 Davis
9,910,979 B2 3/2018 Ben-Haim
9,916,439 B2 3/2018 Jakubowski et al.
10,162,975 B2 12/2018 Ely
10,291,656 B2 5/2019 Ely
10,417,421 B2 9/2019 Touboul
10,496,834 B2 12/2019 Ely
10,666,688 B2 5/2020 Ely
11,316,905 B2 4/2022 Ely
11,743,297 B2 8/2023 Ely
11,979,370 B2 5/2024 McDonald
12,026,261 B2 7/2024 Wyatt et al.
2001/0014102 A1 8/2001 Mattingly
2002/0095540 A1 7/2002 Zolnowsky
2002/0111824 A1 8/2002 Grainger
2002/0193015 A1 12/2002 Milan
2003/0046397 A1 3/2003 Trace
2003/0055994 A1 3/2003 Herrmann
2003/0070084 A1 4/2003 Satomaa
2003/0084319 A1 5/2003 Tarquini et al.
2003/0097431 A1 5/2003 Dill
2003/0097589 A1 5/2003 Syvanne
2003/0110391 A1 6/2003 Wolff
2003/0126468 A1 7/2003 Markham
2003/0131245 A1 7/2003 Linderman
2003/0142683 A1 7/2003 Lam
2003/0148656 A1 8/2003 Huang
2003/0182415 A1 9/2003 Vicard
2003/0224758 A1 12/2003 O'Neill
2003/0229808 A1 12/2003 Heintz et al.
2004/0003262 A1 1/2004 England
2004/0019656 A1 1/2004 Smith
2004/0064575 A1 4/2004 Rasheed
2004/0078568 A1 4/2004 Pham et al.
2004/0085944 A1 5/2004 Boehm
2004/0093520 A1 5/2004 Lee
2004/0123153 A1 6/2004 Wright
2004/0148450 A1 7/2004 Chen et al.
2004/0177274 A1 9/2004 Aroya
2004/0199763 A1 10/2004 Freund
2004/0203296 A1 10/2004 Moreton
2004/0210775 A1 10/2004 Gbadegesin
2004/0237079 A1 11/2004 Cox
2005/0055578 A1 3/2005 Wright
2005/0091522 A1 4/2005 Hearn
2005/0109841 A1 5/2005 Ryan
2005/0114711 A1 5/2005 Hesselink
2005/0114870 A1 5/2005 Song
2005/0149757 A1 7/2005 Corbett
2005/0182883 A1 8/2005 Overtoom
2005/0208967 A1 9/2005 Buniatyan
2005/0254455 A1 11/2005 Plehn
2005/0260996 A1 11/2005 Groenendaal
2005/0265385 A1 12/2005 Cromer
2005/0278544 A1 12/2005 Baxter
2006/0020723 A1 1/2006 Chia-Chun
2006/0022802 A1 2/2006 Bridgelall
2006/0031940 A1 2/2006 Rozman
2006/0037071 A1 2/2006 Rao
2006/0056317 A1 3/2006 Manning
2006/0059092 A1 3/2006 Burshan
2006/0064391 A1 3/2006 Petrov
2006/0065730 A1 3/2006 Quan et al.

(56) References Cited

U.S. PATENT DOCUMENTS

| | | | |
|---|---|---|---|
| 2006/0070129 | A1 | 3/2006 | Sobel et al. |
| 2006/0074896 | A1 | 4/2006 | Thomas |
| 2006/0075494 | A1 | 4/2006 | Bertman |
| 2006/0075501 | A1 | 4/2006 | Thomas |
| 2006/0085528 | A1 | 4/2006 | Thomas |
| 2006/0095595 | A1 | 5/2006 | Dalton et al. |
| 2006/0101277 | A1 | 5/2006 | Meenan et al. |
| 2006/0156415 | A1 | 7/2006 | Rubinstein et al. |
| 2006/0161985 | A1 | 7/2006 | Zhao |
| 2006/0174342 | A1 | 8/2006 | Zaheer |
| 2006/0206300 | A1 | 9/2006 | Garg et al. |
| 2006/0224794 | A1 | 10/2006 | Stevens |
| 2006/0229741 | A1 | 10/2006 | Achanta |
| 2006/0230199 | A1 | 10/2006 | Yu |
| 2006/0242686 | A1 | 10/2006 | Toda |
| 2006/0272020 | A1 | 11/2006 | Gardner |
| 2006/0277405 | A1 | 12/2006 | Bowler |
| 2007/0005987 | A1 | 1/2007 | Durham |
| 2007/0022474 | A1 | 1/2007 | Rowett |
| 2007/0050426 | A1 | 3/2007 | Dubal et al. |
| 2007/0058642 | A1 | 3/2007 | Eisink |
| 2007/0061887 | A1 | 3/2007 | Hoover |
| 2007/0083939 | A1 | 4/2007 | Fruhauf |
| 2007/0097976 | A1 | 5/2007 | Wood |
| 2007/0104197 | A1 | 5/2007 | King |
| 2007/0110053 | A1 | 5/2007 | Soni et al. |
| 2007/0118874 | A1 | 5/2007 | Adams |
| 2007/0118893 | A1 | 5/2007 | Crawford |
| 2007/0123214 | A1 | 5/2007 | Mock |
| 2007/0124536 | A1 | 5/2007 | Carper |
| 2007/0130433 | A1 | 6/2007 | Safa |
| 2007/0130457 | A1 | 6/2007 | Kamat |
| 2007/0143827 | A1 | 6/2007 | Nicodemus |
| 2007/0143851 | A1 | 6/2007 | Nicodemus |
| 2007/0162582 | A1 | 7/2007 | Belali et al. |
| 2007/0192500 | A1 | 8/2007 | Lum |
| 2007/0192854 | A1 | 8/2007 | Kelley |
| 2007/0199060 | A1 | 8/2007 | Touboul |
| 2007/0199061 | A1 | 8/2007 | Byres |
| 2007/0209067 | A1 | 9/2007 | Fogel |
| 2007/0214369 | A1 | 9/2007 | Roberts |
| 2007/0220187 | A1 | 9/2007 | Kates |
| 2007/0233842 | A1 | 10/2007 | Roberts |
| 2007/0240217 | A1 | 10/2007 | Tuvell |
| 2007/0261112 | A1 | 11/2007 | Todd |
| 2007/0266265 | A1 | 11/2007 | Zmudzinski |
| 2007/0281664 | A1 | 12/2007 | Kaneko |
| 2007/0294744 | A1 | 12/2007 | Alessio |
| 2008/0016339 | A1 | 1/2008 | Shukla |
| 2008/0034419 | A1 | 2/2008 | Mullick |
| 2008/0066148 | A1 | 3/2008 | Lim |
| 2008/0082813 | A1 | 4/2008 | Chow et al. |
| 2008/0083030 | A1 | 4/2008 | Durham et al. |
| 2008/0083037 | A1 | 4/2008 | Kruse |
| 2008/0084799 | A1 | 4/2008 | Repasi |
| 2008/0098212 | A1* | 4/2008 | Helms .............. H04N 21/26606 713/155 |
| 2008/0098478 | A1 | 4/2008 | Vaidya |
| 2008/0109871 | A1 | 5/2008 | Jacobs |
| 2008/0114990 | A1 | 5/2008 | Hilbert |
| 2008/0120423 | A1 | 5/2008 | Hall et al. |
| 2008/0134163 | A1 | 6/2008 | Golde |
| 2008/0141349 | A1 | 6/2008 | Lyle |
| 2008/0165957 | A1 | 7/2008 | Kandasamy et al. |
| 2008/0201264 | A1 | 8/2008 | Brown |
| 2008/0235755 | A1 | 9/2008 | Blaisdell |
| 2008/0282337 | A1 | 11/2008 | Crawford |
| 2008/0307240 | A1 | 12/2008 | Dahan et al. |
| 2009/0019223 | A1 | 1/2009 | Lection |
| 2009/0054075 | A1 | 2/2009 | Boejer |
| 2009/0106556 | A1 | 4/2009 | Hamid |
| 2009/0135751 | A1 | 5/2009 | Hodges et al. |
| 2009/0143057 | A1 | 6/2009 | Arun et al. |
| 2009/0165132 | A1 | 6/2009 | Jain |
| 2009/0249465 | A1 | 10/2009 | Touboul |
| 2009/0253454 | A1 | 10/2009 | Sampson |
| 2009/0254993 | A1 | 10/2009 | Leone |
| 2010/0017546 | A1 | 1/2010 | Poo et al. |
| 2010/0064341 | A1 | 3/2010 | Aldera |
| 2010/0186093 | A1 | 7/2010 | Aussel |
| 2010/0195833 | A1 | 8/2010 | Priestley |
| 2010/0218012 | A1 | 8/2010 | Joseph et al. |
| 2010/0225493 | A1 | 9/2010 | Zishaan |
| 2010/0242109 | A1 | 9/2010 | Lee |
| 2010/0251369 | A1 | 9/2010 | Grant |
| 2010/0269172 | A1 | 10/2010 | Xie |
| 2010/0333088 | A1 | 12/2010 | Rogel |
| 2011/0023118 | A1 | 1/2011 | Wright |
| 2011/0154443 | A1 | 6/2011 | Thakur |
| 2011/0154477 | A1 | 6/2011 | Parla |
| 2011/0182180 | A1 | 7/2011 | Riddle |
| 2011/0264931 | A1 | 10/2011 | Chang et al. |
| 2011/0268106 | A1 | 11/2011 | Dalton, Jr. |
| 2011/0269397 | A1 | 11/2011 | Bella |
| 2011/0296397 | A1 | 12/2011 | Vidal et al. |
| 2012/0005756 | A1 | 1/2012 | Hoefelmeyer |
| 2012/0030750 | A1 | 2/2012 | Bhargava et al. |
| 2012/0042391 | A1 | 2/2012 | Risan |
| 2012/0054744 | A1 | 3/2012 | Singh |
| 2012/0084831 | A1 | 4/2012 | Hu |
| 2012/0110320 | A1 | 5/2012 | Kumar |
| 2012/0110331 | A1 | 5/2012 | Falk |
| 2012/0149350 | A1 | 6/2012 | Fan |
| 2012/0173609 | A1 | 7/2012 | Kulaga |
| 2012/0185846 | A1 | 7/2012 | Recio |
| 2012/0216273 | A1 | 8/2012 | Rolette |
| 2012/0233695 | A1 | 9/2012 | Mahaffey et al. |
| 2012/0239739 | A1 | 9/2012 | Manglik et al. |
| 2012/0240183 | A1 | 9/2012 | Sinha |
| 2012/0240236 | A1 | 9/2012 | Wyatt et al. |
| 2012/0254608 | A1 | 10/2012 | Ho |
| 2012/0278543 | A1 | 11/2012 | Yu et al. |
| 2012/0303971 | A1 | 11/2012 | Palka |
| 2012/0324504 | A1 | 12/2012 | Archer et al. |
| 2013/0031601 | A1 | 1/2013 | Bott |
| 2013/0041931 | A1 | 2/2013 | Brand |
| 2013/0064373 | A1 | 3/2013 | Hagbard |
| 2013/0074144 | A1 | 3/2013 | Narayanaswamy |
| 2013/0091534 | A1 | 4/2013 | Gilde |
| 2013/0097659 | A1 | 4/2013 | Das |
| 2013/0097660 | A1 | 4/2013 | Das |
| 2013/0133023 | A1 | 5/2013 | Burstein et al. |
| 2013/0254829 | A1 | 9/2013 | Jakubowski et al. |
| 2014/0032314 | A1 | 1/2014 | Gieseke |
| 2014/0058679 | A1 | 2/2014 | Varoglu |
| 2014/0101716 | A1 | 4/2014 | Touboul |
| 2014/0317679 | A1 | 10/2014 | Wade |
| 2016/0105847 | A1 | 4/2016 | Smith |
| 2016/0234204 | A1 | 8/2016 | Rishi |
| 2017/0039367 | A1 | 2/2017 | Ionescu |
| 2017/0103647 | A1 | 4/2017 | Davis |
| 2019/0238538 | A1 | 8/2019 | Shaw et al. |
| 2019/0268302 | A1 | 8/2019 | McDonald |
| 2020/0285752 | A1 | 9/2020 | Wyatt et al. |
| 2023/0076156 | A1 | 3/2023 | Abotabl et al. |

FOREIGN PATENT DOCUMENTS

| | | | |
|---|---|---|---|
| WO | 2006069041 | 6/2006 | |
| WO | WO-2006108181 A2 * | 10/2006 | ............. G06F 15/00 |
| WO | 2007110094 | 10/2007 | |
| WO | 2008154726 | 12/2008 | |
| WO | 2009004452 | 1/2009 | |
| WO | 2010004296 | 1/2010 | |
| WO | 2013016663 | 1/2013 | |

OTHER PUBLICATIONS

Claessens, Joris et al., "(How) Can Mobile Agents Do Secure Electronic Transactions on Mobile Hosts? A Survey of the Security Issues and the Current Solutions," ACM Transactions on Internet Technology, vol. 3, No. 1, pp. 28-48, Feb. 2003.

(56) References Cited

OTHER PUBLICATIONS

CyberGround Corporation, "Model 1: Wireless Mobile Security Appliance," located at http://support2.cyberguard.com/products/oem/model1.htm, 2005.
Dong et al., "An Opportunistic Scheduler to Blance Performance Measures and Energy Consumption in Wireless Networks: Design and Implementation," Proceedings of the First International Conference on Wireless Internet (WICON'05) (Year: 2005), Conference Paper, Publisher: IEEE, 8 pages.
Entry, Inc., "CyberGuard Develops a Custom Mobile Security Appliance," SecurityProNews, located at http://www.securitypronews.com/news/securitynews/spn-45-20041007CyberGuardDevelo . . . , Oct. 7, 2004.
Fielding, R. et al., "Hypertext Transfer Protocol—HTTP/1.1," I.E.T.F. Network Working Group, RFC 2616, Jun. 1999.
Hall, Marty, "Core Web Programming: Chapter 16—The Hypertext Transfer Protocol," Prentice Hall PTR, ISBN 0-13-625666-X, pp. 867-911, Dec. 1997.
Hall, Marty, "More Servlets and JavaServer Pages: Chapter 2—A Fast Introduction to Basic Servlet Programming," Prentice Hall PTR, ISBN 0-13-067614-4, pp. 34-118, Dec. 1997.
Henmi, Anne et al., "Firewall Policies and VPN Configurations," Syngress Publishing, Inc., ISBN 1-59749-088-1, pp. 99-133, 291-313, Dec. 2006.
Jakobsson, Markus, "Invasive Browser Sniffing and Countermeasures," Proceedings of the 15th International Conference on World Wide Web, pp. 523-532, May 23, 2006.
Kent, S et al., "Security Architecture for the Internet Protocol," I.E.T.F. Network Working Group, RFC 4301, pp. 10-11, Dec. 2005.
Lee, Henry C.J et al., "Port Hopping for Resilient Networks," IEEE 60th Vehicular Technology Conference (VTC2004), Sep. 26, 2004.
Liang et al., "Passive Wake-up Scheme for Wireless Sensor Networks", Second.
International Conference on Innovative Computing, Information and Control, 2007, 4 pages.
Lim et al., "Adaptice power controllable retrodirective array system for wireless sensor server applications", IEEE Transactions on Microwave Theory and Techniques, vol. 53, No. 12, Dec. 2005, pp. 3735-3743.
"Method and System to Provide Automatic Parental Control in Television Broadcasting Environment", downloaded through IP.com, IP.com No. IPCOM000221537D, Sep. 7, 2012 (Year: 2012), 3 pages.
O'brien, Kevin J., "Microsoft Hit by Antitrust Complaint for Browser," The International Herald Tribune, Dec. 14, 2007.
Pmc-Sierra, Inc., "MSP8120 Multi-Service Security Processor," Product Brief, 2007.
Prevelakis, Vassilis et al., "Drop-In Security for Distributed and Portable Computing Elements," Internet Research: Electronic Networking, Applications and Policy, vol. 13, No. 2, pp. 107-115, located at http://www.cs.columbia.edu/~angelos/Papers/InternetResearch-Final.pdf, 2003.
Russo, Alejandro, et al., "Securing Interaction Between Threads and the Scheduler," Proceedings of the 19th IEEE Computer Security Foundations Workshop ( CSFW06), (Year: 2006), Conference Paper, Publisher: IEEE, 13 pages.
Sen, Subhabrata et al., "Accurate, Scalable In-Network, Identification of P2P Traffic Using Application Signatures," Proceedings of the 13th International Conference on World Wide Web, pp. 512-521, May 17, 2004.
Shreeve, Jimmy Lee, "Hasta la Vista, Microsoft !; It's Faster than Windows, It Fights Viruses - and It's Free," Independent Extra, Aug. 29, 2007.
Shuler, Rus, "How Does the Internet Work," white paper, 2002 [retrieved online at https://web.stanford.edu/class/msande91si/www-spr04/readings/week1/InternetWhitepaper.htm on Dec. 11, 2018].
Srisuresh, P et al., "IP Network Address Translator (NAT) Terminology and Considerations," I.E.T.F. Network Working Group, RFC 2663, Aug. 1999.
Srisuresh, P et al., "Traditional IP Network Address Translator (Traditional Nat)," I.E.T.F. Network Working Group, RFC 3022, Jan. 2001.
WatchGuard Technologies, Inc., "Mobile User VPN and PPTP," Internet Security Handbook, copyright 1998-2001, pp. 1-2, located at http://www.watchguard.com/help/Iss/41 /handbook/vpn3.htm, believe published Jun. 5, 2003.
World Wide Web Consortium (W3C), "Http Request Fields," May 3, 1994 [retrieved online at https://web.archive.org/web/20060110150527/http://www.w3.org:80/Protocols/HTTP/HTR.Q_Headers.html on Jan. 24, 2019].
ZyXEL Communications Corp., "ZyXEL Releases Worlds First Palm-Sized Portable Personal Firewall for Ultimate Security: ZyWALL P1 Pushes Network Security to the End-Point PC's with Minimum Administration Effort," ZyXEL News, located at http://global.zyxel.com/news/press.php?indexflag=20050310013432, Mar. 8, 2005.
European Patent Application No. 06821641.5, Examination Report dated Dec. 16, 2016.
European Patent Application No. 06821641.5, Search Report dated May 17, 2011.
European Patent Application No. 08847968.8, Search Report dated Oct. 25, 2011.
European Patent Application No. 13845746.0, Search Report dated Jun. 7, 2016.
International Application No. PCT/IL2006/001428, International Search Report and Written Opinion dated Jul. 15, 2008.
International Application No. PCT/IL2008/000740, International Search Report and Written Opinion dated Nov. 5, 2008.
International Application No. PCT/US2008/055942, International Search Report and Written Opinion dated Apr. 6, 2009.
International Application No. PCT/US2009/065204, International Search Report and Written Opinion dated Jan. 13, 2010.
International Application No. PCT/US2013/064161, International Search Report and Written Opinion dated Apr. 18, 2014.
International Application No. PCT/US2014/045826, International Search Report and Written Opinion dated Oct. 30, 2014.
International Application No. PCT/US2015/015970, International Search Report and Written Opinion dated May 28, 2015.
Decision—Institution of Inter Partes Review of U.S. Pat. No. 9,781,164 entered Jun. 25, 2019, 28 pages.
Decision—Institution of Inter Partes Review of U.S. Pat. No. 8,631,488 entered Aug. 28, 2019, 39 pages.
Decision—Institution of Inter Partes Review of U.S. Pat. No. 9,106,683 entered Aug. 28, 2019, 39 pages.
Decision—Institution of Inter Partes Review of U.S. Pat. No. 9,843,595 entered Aug. 28, 2019, 33 pages.
Decision—Institution of Inter Partes Review of U.S. Pat. No. 8,365,272 entered Jul. 26, 2019, 27 pages.
Decision—Institution of Inter Partes Review of U.S. Pat. No. 9,756,079 entered Jul. 26, 2019, 32 pages.
Decision—Institution of Inter Partes Review of U.S. Pat. No. 8,789,202 entered Sep. 18, 2019, 33 pages.
*Trend Micro Inc.* v. *CUPP Computing AS*, IPR2019-00765, U.S. Pat. No. 9,843,595, Judgment Final Written Decision Determining All Challenged Claims Unpatentable entered Aug. 25, 2020, 47 pages.
*Trend Micro Inc.* v. *CUPP Computing AS*, IPR2019-00803, U.S. Pat. No. 8,789,202, Judgment Final Written Decision Determining No Challenged Claims Unpatentable entered Sep. 15, 2020, 30 pages.
*CUPP Cybersecurity, LLC and CUPP Computing AS* v. *Trend Micro, Inc.*, Trend Micro America, Inc., and Trend Micro Incorporated, Case No. 3:20-cv-03206-K, Complaint for Patent Infringement, filed Oct. 20, 2020, 99 pages.
*CUPP Cybersecurity, LLC and CUPP Computing AS* v. *Trend Micro, Inc.*, Trend Micro America, Inc., and Trend Micro Incorporated, Case No. 20-cv-03206-M, First Amended Complaint for Patent Infringement, filed Apr. 23, 2021, 140 pages.
Decision Granting Institution of Inter Partes Review of U.S. Pat. No. 10,621,344 entered Oct. 25, 2021, 38 pages.
Decision Granting Institution of Inter Partes Review of U.S. Pat. No. 10,951,632 entered Jan. 19, 2022, IPR2021-01236, 46 pages.

(56) References Cited

OTHER PUBLICATIONS

Decision Granting Institution of Inter Partes Review of U.S. Pat. No. 10,951,632 entered Jan. 19, 2022, IPR2021-01237, 25 pages.
*Trend Micro Inc.* v. *CUPP Computing AS*, IPR2021-00813, U.S. Pat. No. 10,621,344, Judgment Final Written Decision Determining All Challenged Claims Unpatentable entered Oct. 14, 2022, 41 pages.
*Trend Micro Inc.* v. *CUPP Computing AS*, IPR2021-01236, U.S. Pat. No. 10,951,632, Judgment Final Written Decision Determining All Challenged Claims Unpatentable entered Jan. 17, 2023, 49 pages.
*Trend Micro Inc.* v. *CUPP Computing AS*, IPR2021-01237, U.S. Pat. No. 10,951,632, Judgment Final Written Decision Determining All Challenged Claims Unpatentable entered Jan. 17, 2023, 30 pages.
Inter Partes Review Certificate, U.S. Pat. No. 9,781,164 K1, issued May 12, 2023, 2 pages.
Inter Partes Review Certificate, U.S. Pat. No. 8,631,488 K1, issued Jun. 21, 2023, 2 pages.
Inter Partes Review Certificate, U.S. Pat. No. 9,106,683 K1, issued Jun. 21, 2023, 2 pages.
Inter Partes Review Certificate, U.S. Pat. No. 9,843,595 K1, issued Jun. 21, 2023, 2 pages.
Inter Partes Review Certificate, U.S. Pat. No. 8,365,272 K1, issued Jul. 5, 2023, 2 pages.
Inter Partes Review Certificate, U.S. Pat. No. 9,756,079 K1, issued Jul. 7, 2023, 2 pages.
Inter Partes Review Certificate, U.S. Pat. No. 10,951,632 K1, issued Oct. 7, 2025, 2 pages.
USB (Universal Serial Bus Specification), Revision 2.0, Apr. 27, 2000, retrieved from: <URL: https://bitsavers.trailing-edge.com/components/usb/USB_2.0_2000.pdf>, (Year: 2000), 650 pages.

* cited by examiner

SYSTEM AND METHOD FOR IMPLEMENTING CONTENT AND NETWORK SECURITY INSIDE A CHIP

CROSS REFERENCE TO RELATED APPLICATIONS

This application is a continuation of U.S. patent application Ser. No. 18/242,795, filed Sep. 6, 2023, and entitled "System and Method for Implementing Content and Network Security Inside a Chip," which is a continuation of U.S. patent application Ser. No. 17/362,412, filed Jun. 29, 2021, and entitled "System and Method for Implementing Content and Network Security Inside a Chip," now U.S. Pat. No. 11,757,835, which is a continuation of U.S. patent application Ser. No. 16/389,886, filed Apr. 19, 2019, and entitled "System and Method for Implementing Content and Network Security Inside a Chip," now U.S. Pat. No. 11,050,712, which is a continuation of U.S. patent application Ser. No. 14/520,314, filed Oct. 21, 2014, and entitled "System and Method for Implementing Content and Network Security Inside a Chip," now U.S. Pat. No. 10,541,969, which is a continuation of U.S. patent application Ser. No. 12/402,443, filed Mar. 11, 2009, and entitled "System and Method for Implementing Content and Network Security Inside a Chip," now U.S. Pat. No. 8,869,270, which claims priority to U.S. Provisional Patent Application Ser. No. 61/039,729, filed Mar. 26, 2008 and entitled "Methods for Implementing Content and Network security Inside Communication and Memory Chips," which are incorporated by reference herein. This application also incorporates by reference U.S. patent application Ser. No. 11/376,919, filed Mar. 15, 2006 and entitled "System and Method for Providing Network Security to Mobile Devices," now U.S. Pat. No. 8,381,297, which claims priority to U.S. Provisional Patent Application Ser. No. 60/750,326, filed Dec. 13, 2005 and entitled "Personal Security Appliance," which is also incorporated by reference herein.

TECHNICAL FIELD

This invention relates generally to network security, and more particularly provides a system and method for implementing content and network security inside a chip.

BACKGROUND

The internet is an interconnection of millions of individual computer networks owned by governments, universities, nonprofit groups, companies and individuals. While the internet is a great source of valuable information and entertainment, the internet has also become a major source of system damaging and system fatal application code, such as "viruses," "spyware," "adware," "worms," "Trojan horses," and other malicious code.

To protect users, programmers design computer and computer-network security systems for blocking malicious code from attacking both individual and network computers. On the most part, network security systems have been relatively successful. A computer that connects to the internet from within an enterprise's network typically has two lines of defense. The first line of defense includes a network security system, which may be part of the network gateway, that includes firewalls, anti-virus, anti-spyware and content filtering. The second line of defense includes individual security software on individual machines, which is not typically as secure as the network security system and is thus more vulnerable to attacks. In combination, the first and second lines of defense together provide pretty good security protection. However, when a device connects to the internet without the intervening network security system, the device loses its first line of defense. Thus, mobile devices (e.g., laptops, desktops, PDAs such as RIM's Blackberry, cell phones, any wireless device that connects to the internet, etc.) when traveling outside the enterprise network are more vulnerable to attacks.

FIG. 1 illustrates an example network system 100 of the prior art. Network system 100 includes a desktop 105 and a mobile device 110, each coupled to an enterprise's intranet 115. The intranet 115 is coupled via a network security system 120 (which may be a part of the enterprise's gateway) to the untrusted internet 130. Accordingly, the desktop 105 and mobile device 110 access the internet 130 via the network security system 120. A security administrator 125 typically manages the network security system 120 to assure that it includes the most current security protection and thus that the desktop 105 and mobile device 110 are protected from malicious code. Demarcation 135 divides the trusted enterprise 140 and the untrusted public internet 130. Because the desktop 105 and the mobile device 110 are connected to the internet 130 via the network security system 120, both have two lines of defense (namely, the network security system 120 and the security software resident on the device itself) against malicious code from the internet 130. Of course, although trusted, the intranet 115 can also be a source of malicious code.

FIG. 2 illustrates an example network system 200 of the prior art, when the mobile device 110 has traveled outside the trusted enterprise 140 and reconnected to the untrusted internet 130. This could occur perhaps when the user takes mobile device 110 on travel and connects to the internet 130 at a cybercafé, at a hotel, or via any untrusted wired or wireless connection. Accordingly, as shown, the mobile device 110 is no longer protected by the first line of defense (by the network security system 120) and thus has increased its risk of receiving malicious code. Further, by physically bringing the mobile device 110 back into the trusted enterprise 140 and reconnecting from within, the mobile device 110 risks transferring any malicious code received to the intranet 115.

As the number of mobile devices and the number of attacks grow, mobile security is becoming increasingly important. The problem was emphasized in the recent Info-Security Conference in New York on Dec. 7-8, 2005. However, no complete solutions were presented.

There is a need for personal security appliances capable of providing levels of network security as provided by enterprise network security systems.

SUMMARY

An embodiment of the present invention uses a small piece of hardware that connects to a mobile device and filters out attacks and malicious code. The piece of hardware may be referred to as a "mobile security system" or "personal security appliance." Using the mobile security system, a mobile device can be protected by greater security and possibly by the same level of security offered by its associated corporation/enterprise.

In an embodiment, a mobile security system includes a connection mechanism for connecting to a data port of a mobile device and for communicating with the mobile device; a network connection module for acting as a gateway to a network; a security policy for determining whether to forward content intended for the mobile device to the mobile device; and a security engine for executing the security policy.

The connection mechanism may include at least one of a USB connector, a PCMCIA connector, an Ethernet connector, an internal computer bus, a computer local bus, memory bus, network bus, hard disks bus, serial bus, parallel bus and/or a BlueTooth communication module. The network connection module may include a network interface card that implements WiFi, WiMAX, GPRS, GSM, UMTS, CDMA, Generation 3, other cell phone internet connection protocols, etc. The security engine may include at least one of an antivirus engine, an antispyware engine, a firewall engine, an IPS/IDS engine, a content filtering engine, a multilayered security monitor, a bytecode monitor, and a URL monitor. The security policy may performs weighted risk analysis based on content type, content source, content category, or historical actions of the user. The remote management module may be capable of receiving security policy updates, security engine updates, and security data updates (including malicious content signatures). The mobile security system may include a distribution module capable of forwarding updates to other mobile security systems, and/or a backup module capable of storing at least a portion of the boot sector of the mobile device should the boot sector of the mobile device become compromised. The mobile security system may include a remote configuration module capable of communicating with a wizard, the wizard being in communication with an enterprise network security system, the wizard capable of substantially automatic generation of policies and data based on the policies and data on the enterprise network security system, the remote configuration module capable of installing the policies and data generated by the wizard. The mobile security system may include a preboot memory that is not accessible during runtime, the preboot memory storing a copy of at least a portion of the operating system of the mobile security system, the mobile security system being configured to load the operating system portion every time the mobile security system is rebooted.

In another embodiment, a method comprises receiving a network connection request from a mobile device outside of a trusted network; acting as a gateway to a network on behalf of the mobile device; receiving information intended for the mobile device from the network; and determining whether to forward the information to the mobile device in accordance with a security policy.

In another embodiment, a mobile security system comprises means for acting as a gateway to a network on behalf of a mobile device outside of a trusted network; receiving information intended for the mobile device from the network; and determining whether to forward the information to the mobile device in accordance with a security policy.

In yet another embodiment, a method comprises receiving internet traffic on a mobile device via a wireless connection; redirecting the internet traffic at the kernel level to a mobile security system; scanning the internet traffic for violations of a security policy; cleaning the internet traffic of any violations of the security policy to generate cleaned internet traffic; and sending the cleaned internet traffic to the mobile device for execution.

In still another embodiment, a system comprises a wireless network interface card on a mobile device for receiving internet traffic; a kernel-level redirector on the mobile device for redirecting the internet traffic at the kernel level to a mobile security system; a security engine for scanning the internet traffic for violations of a security policy and for cleaning the internet traffic of any violations of the security policy to generate cleaned internet traffic; and a connection mechanism for receiving the redirected internet traffic from the kernel-level redirector and for sending the cleaned internet traffic to the mobile device for execution.

Systems and methods for implementing content and network security inside a chip are disclosed. In exemplary embodiments, a system comprises a communication chip and a second processor. The communication chip comprises a router and security instructions. The router is configured to intercept untrusted data between a network and a first router. The second processor is configured to receive the untrusted data from the router, process the untrusted data with the security instructions to produce trusted data, and provide the trusted data to the router.

The security instructions may comprise an operating system. The security instructions may also be stored in a protected memory. The security instructions may be loaded into RAM of a digital device.

The communication chip may be within a network interface card. The second processor may be within the communication chip. The first processor may comprise the second processor In other embodiments, the system comprises a flash memory device and a second processor. The flash memory device may comprise flash memory media, a router, and security instructions. The router may be configured to intercept untrusted data between a first processor and the flash memory media. The second processor may be configured to receive the untrusted data from the router, to process the untrusted data with the security instructions to produce trusted data, and to provide the trusted data to the router.

In some embodiments, a method comprises storing security instructions, loading the security instructions into a memory, executing the security instructions with a second processor, intercepting untrusted data between a network and a first processor with a router in a communication chip, routing the untrusted data from the router to the second processor, processing the untrusted data with the second processor executing the security instructions to produce trusted data, and providing the trusted data from the second processor to the router.

Alternatively, a method may comprise, in some embodiments, storing security instructions, loading the security instructions into a memory, executing the security instructions with a second processor, intercepting untrusted data between a first processor and flash memory media, routing the untrusted data from the router to the second processor, processing the untrusted data with the second processor executing the security instructions to produce trusted data, and providing the trusted data from the second processor to the router.

An exemplary computer readable medium is configured to store instructions in a communication chip, the instructions executable by a processor to perform a method. The method comprises, before reaching a destination, intercepting untrusted data between a network and a first processor within in a communication chip, routing the untrusted data to the second processor, processing the untrusted data with the second processor executing the security instructions to produce trusted data, and providing the trusted data from the second processor to the data's destination.

An exemplary computer readable medium is configured to store instructions in a flash memory device, the instructions executable by a processor to perform a method. The method comprises, before reaching a destination, intercepting untrusted data between a first processor and flash memory media within the flash memory device, routing the untrusted data to the second processor, processing the untrusted data with the second processor executing the security instructions to produce trusted data, and providing the trusted data from the second processor to the data's destination.

DETAILED DESCRIPTION

The following description is provided to enable any person skilled in the art to make and use the invention, and is provided in the context of a particular application and its requirements. Various modifications to the embodiments may be possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

An embodiment of the present invention uses a small piece of hardware that connects to a mobile device and filters out attacks and malicious code. The piece of hardware may be referred to as a "mobile security system" or "personal security appliance." Using the mobile security system, a mobile device can be protected by greater security and possibly by the same level of security offered by its associated corporation/enterprise.

Figure 1:
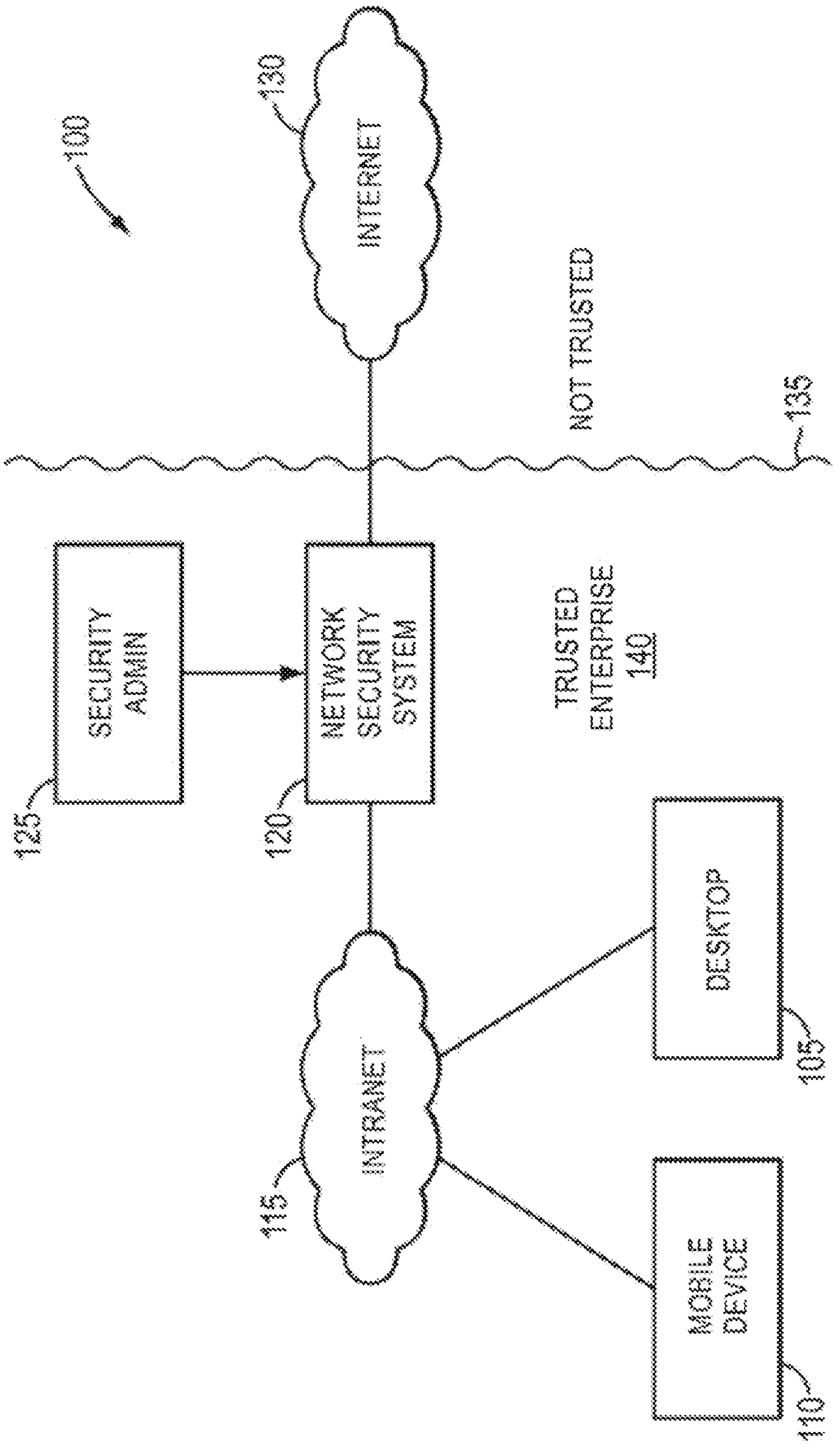
FIG. 1 (PRIOR ART)
FIG. 1 is a block diagram of a prior art network system in a first state.
Figure 2:
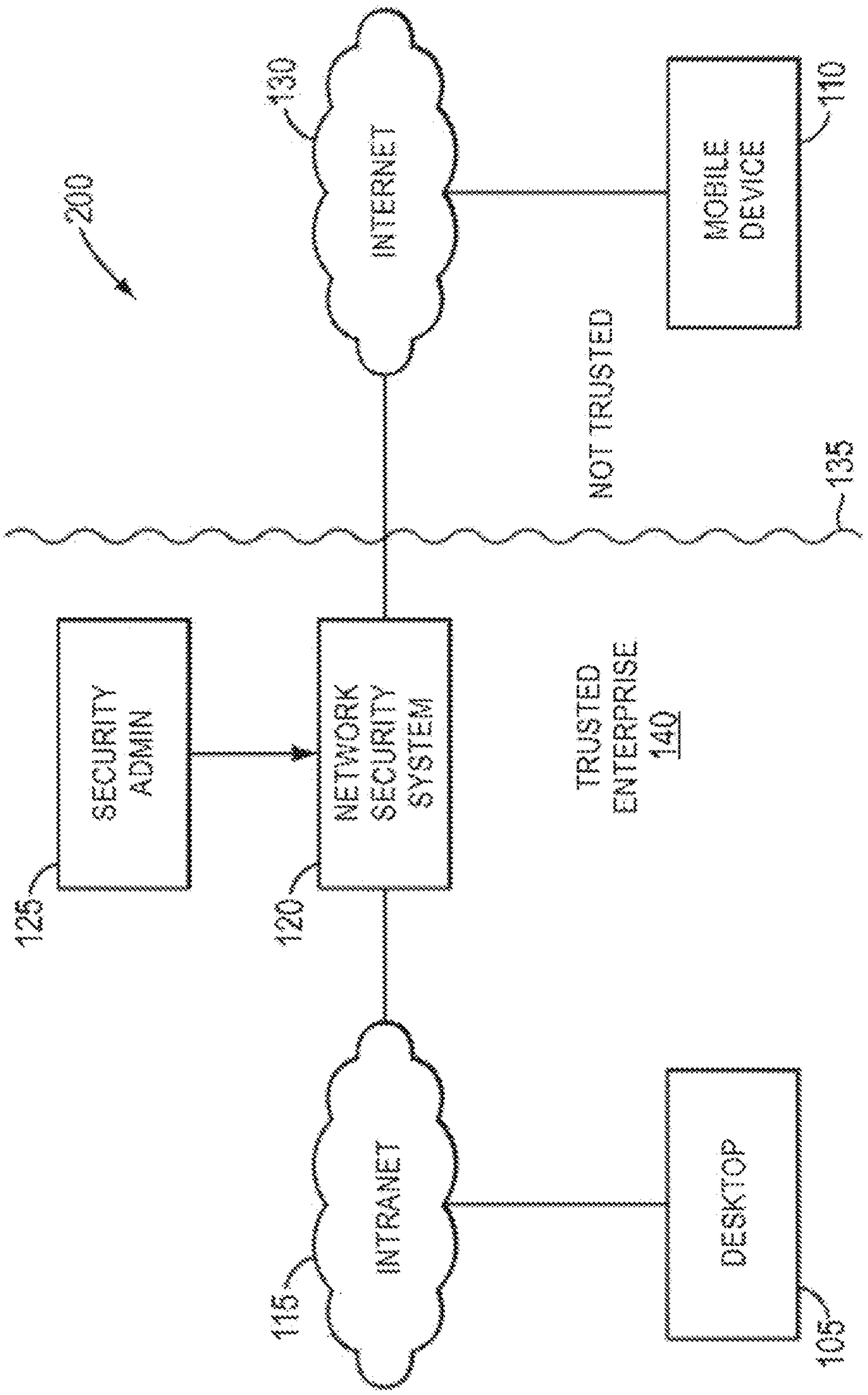
FIG. 2 (PRIOR ART)
FIG. 2 is a block diagram of a prior art network system in a second state.
Figure 3:
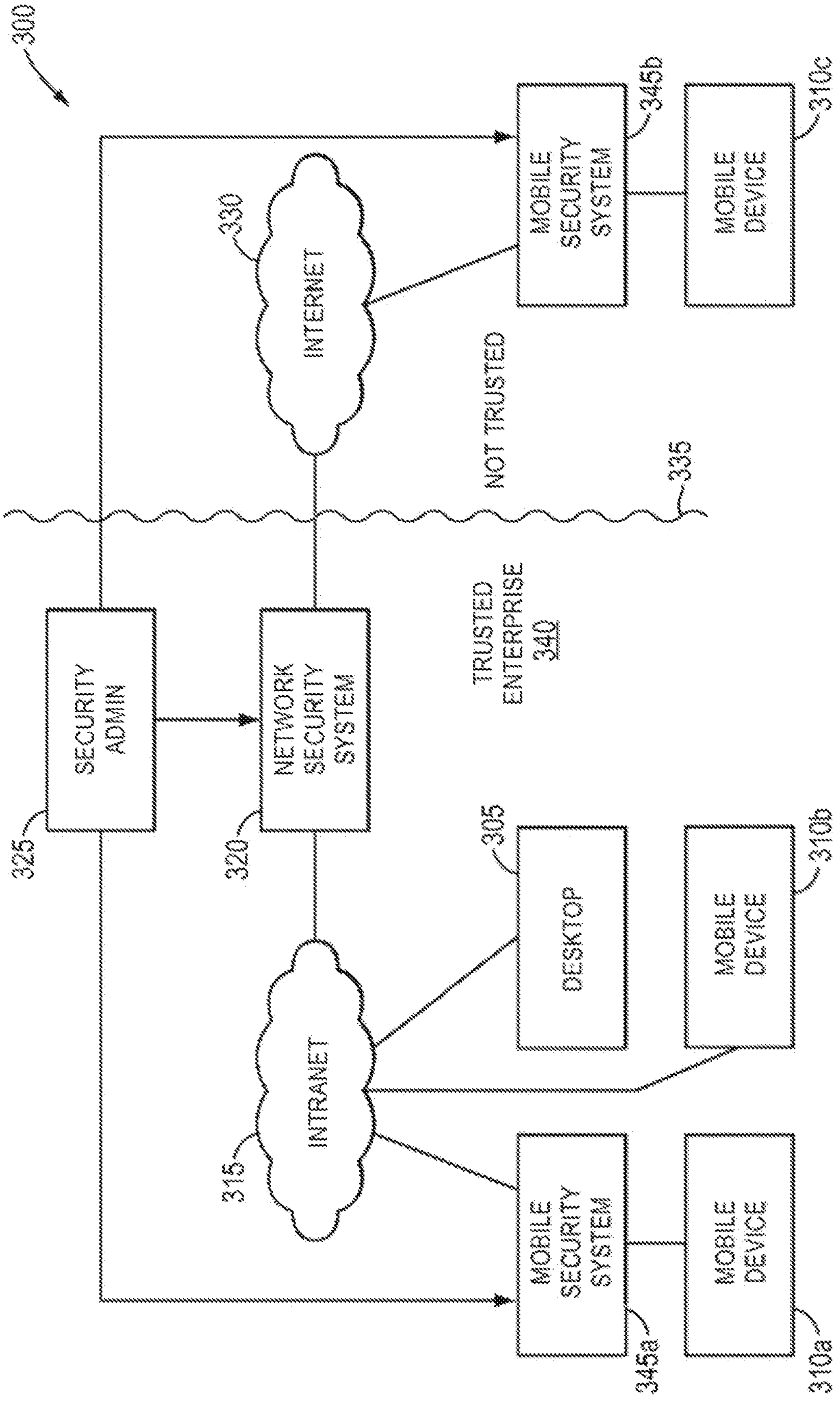
FIG. 3 is a block diagram of a network system in accordance with an embodiment of the present invention.

FIG. 3 illustrates a network system 300 in accordance with an embodiment of the present invention. Network system 300 includes a desktop 305, a first mobile device 310*a*, and a second mobile device 310*b*. The first mobile device 310*a* is illustrated as within the enterprise network 340 at this time and is coupled via a mobile security system 345*a* to the enterprise's intranet 315. The desktop 305 and second mobile device 310*b* are also within the enterprise network 340 but in this embodiment are coupled to the intranet 315 without an intervening mobile security system 345 such as mobile security system 345*b*. The intranet 315 is coupled via a network security system 320 (which may be part of the enterprise's gateway) to the untrusted internet 330. Accordingly, the first mobile device 310*a*, the second mobile device 310*b* and the desktop 305 access the untrusted internet 330 via the network security system 320. Each may also be protected by a personal security system resident thereon (not shown). A third mobile device 310*c* is currently outside the enterprise network 340 and is coupled via a mobile security system 345*b* to the untrusted internet 330. The third mobile device 310 may be in use by an employee of the trusted enterprise 340 who is currently on travel. A security administrator 325 manages the mobile security system 345*a*, the mobile security system 345*b*, and the network security system 320 to assure that they include the most current security protection. One skilled in the art will recognize that the same security administrator need not manage the various devices. Further, the security administrator could be the user and need not be within the trusted enterprise 340.

Demarcation 335 divides the trusted enterprise 340 and the untrusted publicly accessible internet 330. Each of mobile device 310*a*, 310*b* and 310*c* may be referred to generically as mobile device 310, although they need not be identical. Each mobile security system 345*a* and 345*b* may be referred to generically as mobile security system 345, although they need not be identical.

As shown, although the mobile device 310*c* has traveled outside the trusted enterprise 340, the mobile device 310*c* connects to the untrusted internet 330 via the mobile security system 345*b* and thus retains two lines of defense (namely, the mobile security system 345*b* and the security software resident on the device itself). In this embodiment, the mobile security system 345 effectively acts as a mobile internet gateway on behalf of the mobile device 310*c*. In an embodiment, the mobile security system 345 may be a device dedicated to network security. In an embodiment, each mobile security system 345 may support multiple mobile devices 310, and possibly only registered mobile devices 310, e.g., those belonging to enterprise 340.

Each mobile security system 345 (e.g., 345*a*, 345*b*) may be a miniature server, based on commercial hardware (with Intel's Xscale or any other CPU as the core), Linux OS and network services, and open-source firewall, IDS/IPS and antivirus protection. The mobile security system 345 may be based on a hardened embedded Linux 2.6.

In this embodiment, because the security administrator 325 is capable of remotely communicating with the mobile security system 345*b*, IT can monitor and/or update the security policies/data/engines implemented on the mobile security system 345*b*. The security administrator 325 can centrally manage all enterprise devices, remotely or directly. Further, the security administrator 325 and mobile security systems 345 can interact to automatically translate enterprise security policies into mobile security policies and configure mobile security systems 345 accordingly. Because the mobile security system 345 may be generated from the relevant security policies of the enterprise 340, the mobile device 310*c* currently traveling may have the same level of protection as the devices 305/310 within the trusted enterprise 340.

Figure 8:
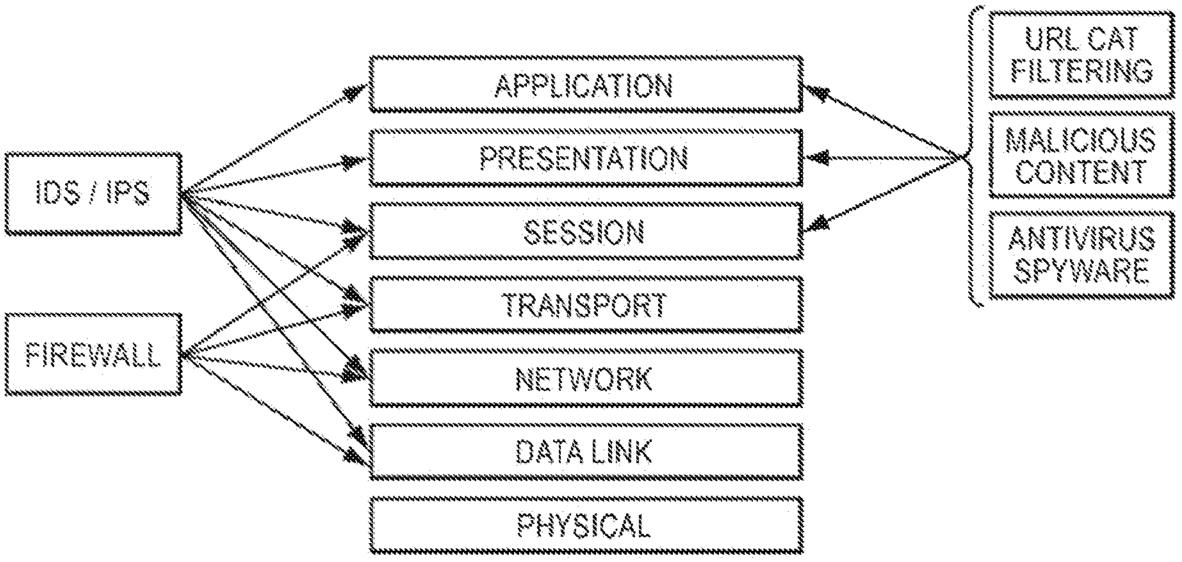
FIG. 8 is a block diagram illustrating details of network security measures relative to the OSI layers.

The mobile security system 345 may be designed as an add-on to existing software security or to replace all security hardware and software on a traveling mobile device. These security applications will preferably operate on different OSI layers to provide maximum security and malicious code detection, as shown in the example system illustrated in FIG. 8. Operating on the lower OSI layers and doing TCP/IP packets analysis only (by screening firewall or router packets) would miss virus and/or worm behavior. Also, many modern viruses use mobile code implemented on a "higher" level than the 7th OSI layer (Application—HTTP, FTP, etc.) and therefore cannot be interpreted at the packet layer nor at the application layer. For example, applying antivirus analysis only at the session or transport layer on a malicious Java Script (that is included in an HTML page), trying to match the signature with packets and without understanding the content type (Java Script), will not detect the malicious nature of the Java Script. To offer greater protection, the mobile security system 345 may act as corporate class security appliance and engage different security applications based on the content type and the appropriate OSI layers, (or even a "higher" level if content is encapsulated in the application layer). The mobile security system 345 may be configured to perform content analysis at different OSI layers, e.g., from the packet level to the application level. It will be appreciated that performing deep inspection at the application level is critical to detect malicious content behavior and improve detection of viruses, worms, spyware, Trojan horses, etc. The following software packages may be implemented on the mobile security system 345:

- Firewall and VPN—including stateful and stateless firewalls, NAT, packet filtering and manipulation, DOS/DDOS, netfilter, isolate user mobile devices from the internet and run VPN program on the device, etc.
- Optional web accelerator and bandwidth/cache management based on Squid.
- IDS/IPS—Intrusion detection and prevention system based on Snort. Snort is an open source network intrusion prevention and detection system utilizing a rule-driven language, which combines the benefits of signature, protocol- and anomaly-based inspections.
- Antivirus and antispyware based on ClamAV; additional AV and AS engines, e.g., McAfee, Kaspersky, Pandamay, may be offered for additional subscription fees.
- Malicious Content Detection—on the fly heuristics that perform content analysis to detect malicious content before having signatures. This will be based on a rule base and updated rules and will be content dependent scanning.
- URL Categorization Filtering—based on a commercial engine, such as Surfcontrol, Smart Filters or Websense. May provide around 70 categories of URLs such as gambling, adult content, news, webmail, etc. The mobile device 345 may apply different security policies based on the URL category, e.g., higher restriction and heuristics for Gambling or Adult content web sites, etc.

Figure 4:
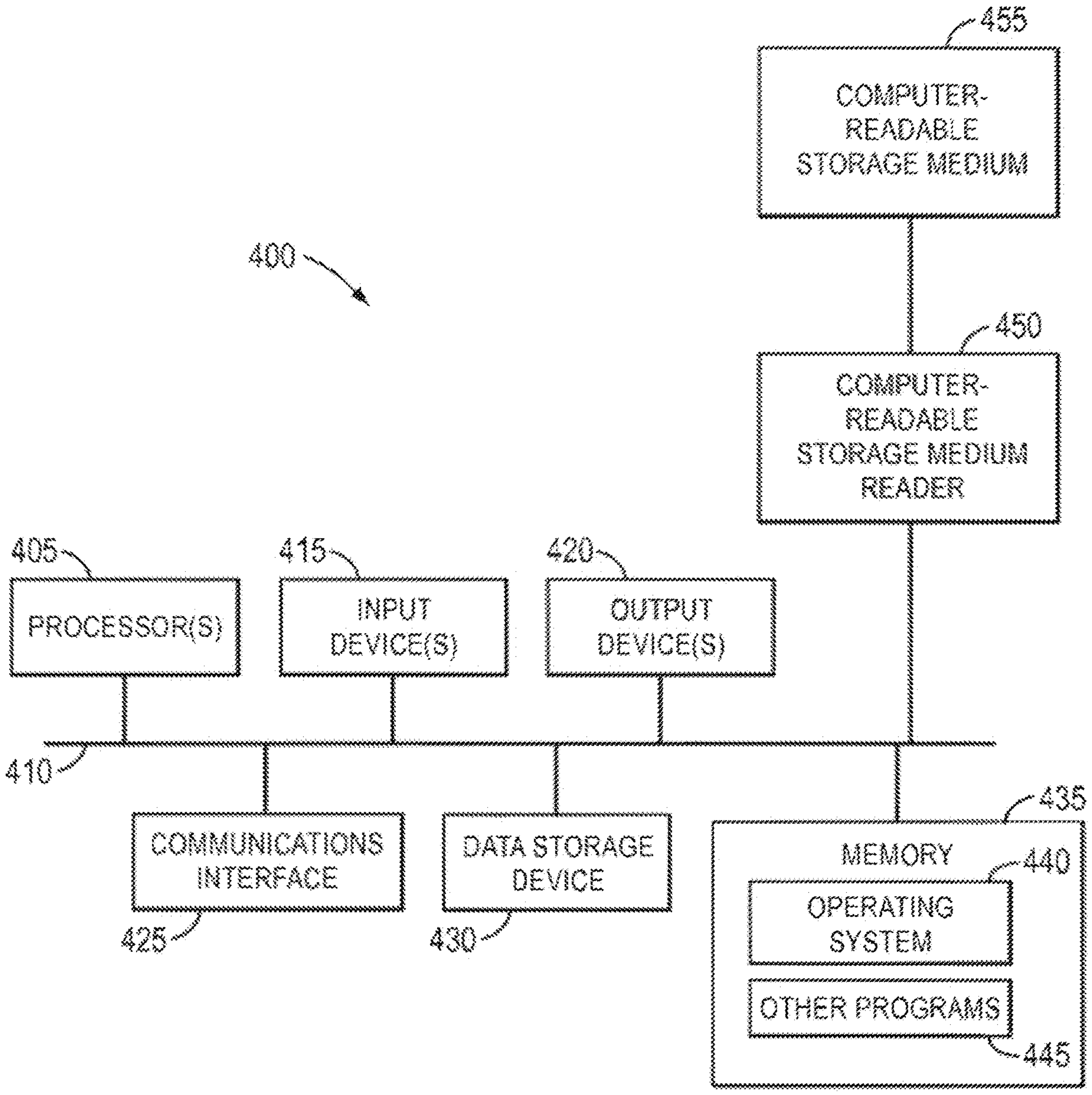
FIG. 4 is a block diagram illustrating details of a computer system in accordance with an embodiment of the present invention.

FIG. 4 is a block diagram illustrating details of an example computer system 400, of which each desktop 305, mobile device 310, network security system 320, mobile security system 345, and security administrator 325 may be an instance. Computer system 400 includes a processor 405, such as an Intel Pentium® microprocessor or a Motorola Power PC® microprocessor, coupled to a communications channel 410. The computer system 400 further includes an input device 415 such as a keyboard or mouse, an output device 420 such as an LCD or cathode ray tube display, a communications device 425, a data storage device 430 such as a magnetic disk, Solid State Disk, or flash memory, and memory 435 such as Random-Access Memory (RAM), each coupled to the communications channel 410. The communications interface 425 may be coupled directly or via a mobile security system 345 to a network such as the internet. One skilled in the art will recognize that, although the data storage device 430 and memory 435 are illustrated as different units, the data storage device 430 and memory 435 can be parts of the same unit, distributed units, virtual memory, etc.

The data storage device 430 and/or memory 435 may store an operating system 440 such as the Microsoft Windows XP, the IBM OS/2 operating system, the MAC OS, UNIX OS, LINUX OS and/or other programs 445. It will be appreciated that a preferred embodiment may also be implemented on platforms and operating systems other than those mentioned. An embodiment may be written using JAVA, C, and/or C++ language, or other programming languages, possibly using object oriented programming methodology.

One skilled in the art will recognize that the computer system 400 may also include additional information, such as network connections, additional memory, additional processors, LANs, input/output lines for transferring information across a hardware channel, the internet or an intranet, etc. One skilled in the art will also recognize that the programs and data may be received by and stored in the system in alternative ways. For example, a computer-readable storage medium (CRSM) reader 450 such as a magnetic disk drive, hard disk drive, magneto-optical reader, CPU, etc. may be coupled to the communications bus 410 for reading a computer-readable storage medium (CRSM) 455 such as a magnetic disk, a hard disk, a magneto-optical disk, RAM, etc. Accordingly, the computer system 400 may receive programs and/or data via the CRSM reader 450. Further, it will be appreciated that the term "memory" herein is intended to cover all data storage media whether permanent or temporary.

Figure 5:
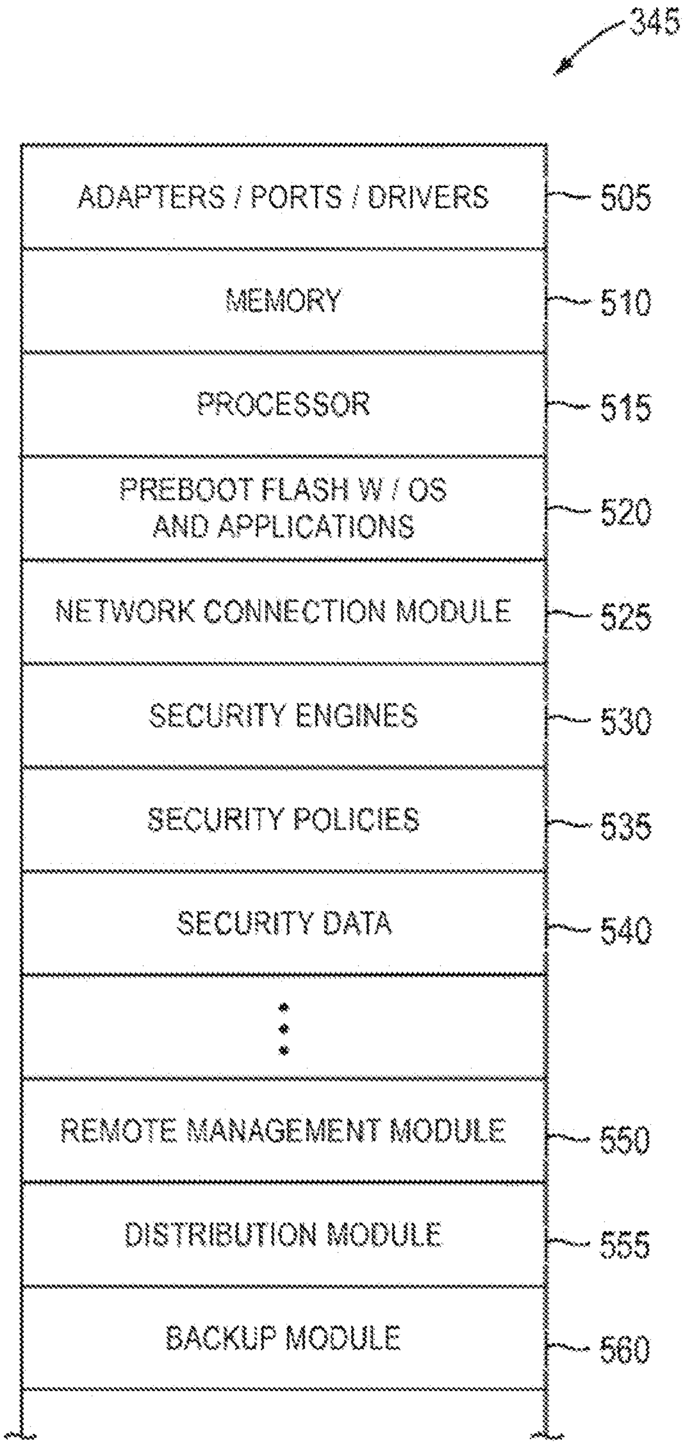
FIGS. 5 and 5A are block diagrams illustrating details of the mobile security system in accordance with an embodiment of the present invention.

FIG. 5 is a block diagram illustrating details of the mobile security system 345 in accordance with an embodiment of the present invention. Mobile security system 345 includes adapters/ports/drivers 505, memory 510, a processor 515, a preboot flash/ROM memory module 520 storing a secure version of the mobile security system's operating system and other applications, network connection module 525, security engines 530, security policies 535, security data 540, remote management module 550, distribution module 555, and backup module 560. Although these modules are illustrated as within the mobile security system 345, one skilled in the art will recognize that many of them could be located elsewhere, e.g., on the security administrator 325 or on third-party systems in communication with the mobile security system 345. The mobile security system 345 may be in a pocket-size, handheld-size or key-chain size housing, or possibly smaller. Further, the mobile security system 345 may be incorporated within the mobile device 310.

The adapters/ports/drivers 505 include connection mechanisms (including software, e.g., drivers) for USB, Ethernet, WiFi, WiMAX, GSM, CDMA, BlueTooth, PCMCIA, an Internal computer bus, a computer local bus, memory bus, network bus, hard disks bus, serial or parallel bus, and/or other connection data ports on the mobile security system 345. In one embodiment, the adapters/ports/drivers 505 may be capable of connection to multiple devices 310 to provide network security to the multiple devices 310.

Memory 510 and processor 515 execute the operating system and applications on the mobile security system 345. In this example, the preboot flash 520 stores the operating system and applications. At boot time, the operating system and applications are loaded from the preboot flash 520 into memory 510 for execution. Since the operating system and applications are stored in the preboot flash 520, which cannot be accessed during runtime by the user, the operating system and applications in the preboot flash 520 are not corruptible. Should the copy of the operating system and applications in memory 510 be corrupted, e.g., by malicious code, the operating system and applications may be reloaded into the memory 510 from the preboot flash 520, e.g., upon restart. Although described as stored within the preboot flash 520, the OS and applications can be securely stored within other read-only memory devices, such as ROM, PROM, EEPROM, etc.

Figure 5A:
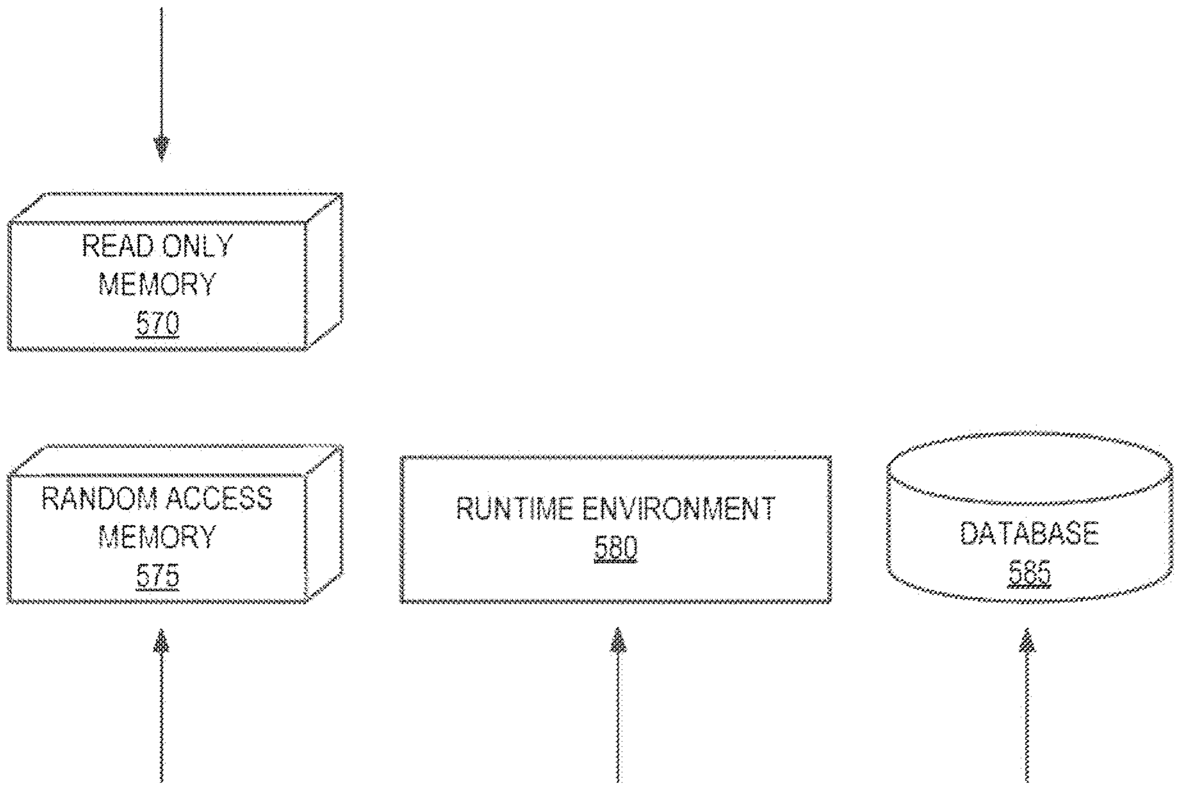

As shown in FIG. 5A, memory (including memory 510 and preboot flash 520) on the mobile security system 345 may be divided into the following zones: read only memory 570; random access memory 575 for storing a copy of the OS, kernel and security applications; runtime environment 580; and database 585 for storing application data, log files, etc.

Upon each "hard" restart, the boot loader (resident at area 1 in read only memory 570) of the mobile security system 345 copies the kernel and security applications (a fresh unchanged copy) from read only memory 570 to random access memory 575. This causes a clean version of the OS and applications to be loaded into random access memory 575 each time. That way, if a special attack on mobile security system 345 is developed, the attack will be unable to infect the system, since the OS and applications are precluded from accessing read only memory 570 during runtime. Further, any attack that does reach memory 510 will be able to run only once and will disappear upon a hard restart. A triggering mechanism may be available to restart the mobile security system 345 automatically upon infection detection.

The network connection module 525 enables network connection, e.g., to the internet 330 or the intranet 315 via network communication hardware/software including WiFi, WiMAX, CDMA, GSM, GPRS, Ethernet, modem, etc. For example, if the mobile device 310 wishes to connect to the internet 330 via a WiFi connection, the adapters/ports/drivers 505 may be connected to the PCI port, USB port or PCMCIA port of the mobile device 310, and the network connection module 525 of the mobile security system 345 may include a WiFi network interface card for connecting to wireless access points. Using the network connection module 425, the mobile security system 345 may communicate with the network as a secure gateway for the mobile device 310. Other connection architectures are described in FIGS. 10A-10C.

The security engines 530 execute security programs based on the security policies 535 and on security data 540, both of which may be developed by IT managers. Security engines 530 may include firewalls, VPN, IPS/IDS, anti-virus, anti-spyware, malicious content filtering, multilayered security monitors, Java and bytecode monitors, etc. Each security engine 530 may have dedicated security policies 535 and security data 540 to indicate which procedures, content, URLs, system calls, etc. the engines 530 may or may not allow. The security engines 530, security policies 535 and security data 540 may be the same as, a subset of, and/or developed from the engines, policies and data on the network security system 320.

To provide a higher security level provided by antivirus and antispyware software, the security engines 530 on each mobile security system 345 may implement content analysis and risk assessment algorithms. Operating for example at OSI Layer 7 and above (mobile code encapsulated within Layer 7), these algorithms may be executed by dedicated High Risk Content Filtering (HRCF) that can be controlled by a rules engine and rule updates. The HRCF will be based on a powerful detection library that can perform deep content analysis to verify real content types. This is because many attacks are hidden within wrong mime types and/or may use sophisticated tricks to present a text file type to a dangerous active script or ActiveX content type. The HRCF may integrate with a URL categorization security engine 530 for automatic rule adjustment based on the URL category. In one embodiment, when the risk level increases (using the described mechanism) the mobile security system 345 may automatically adjust and increase filtering to remove more active content from the traffic. For example, if greater risk is determined, every piece of mobile code, e.g., Java script, VB script, etc. may be stripped out.

Three aspects for integration with corporate policy server legacy systems include rules, LDAP and active directory, and logging and reporting as discussed below. In one embodiment, a policy import agent running on the security administrator 325 will access the rule base of Checkpoint Firewall-1 and Cisco PIX Firewalls and import them into a local copy. A rule analysis module will process the important rules and will offer out-of-the-box rules and policies for mobile security systems 345. This proposed policy will offer all mobile security systems 345 a best fit of rules that conform the firewall policy of the enterprise 340. The agent will run periodically to reflect any changes and generate updates for mobile security system 345 policies 535. The LDAP and Active Directory may be integrated with the directory service to maintain mobile security system 345 security policies 535 that respond to the enterprise's directory definitions. For example, a corporate policy for LDAP user Group "G" may automatically propagate to all mobile security systems 345 in "G" group. Mobile security system 345 local logs and audit trails may be sent in accordance to a logging and reporting policy to a central log stored at the security administrator 325. Using a web interface, IT may be able to generate reports and audit views related to all mobile device 310 users, their internet experiences, and attempts to bring infected devices back to the enterprise 340. IT will be able to forward events and log records into legacy management systems via SYSLOG and SNMP Traps.

The security engines 530 may perform weighted risk analysis. For example, the security engine 530 may analyze content transferred via protocols such as HTTP, FTP, SMTP, POP3, IM, P2P, network layer 1 to layer 6 (based on OSI model), SCSI, ISCSI, IDE, ATA, SATA and other hard disk protocols, etc. including any traffic arriving from the internet 330. The security engine 530 may assign a weight and rank for every object based on its type, complexity, richness in abilities, source of the object, etc. The security engine 530 may assign weight based on the source using a list of known dangerous or known safe sources. The security engine 530 may assign weight to objects based on the category of the source, e.g., a gambling source, an adult content source, a news source, a reputable company source, a banking source, etc. The security engine 530 may calculate the weight, and based on the result determine whether to allow or disallow access to the content, the script to run, the system modification to occur, etc. The security engine 530 may "learn" user content (by analyzing for a predetermined period of time the general content that the user accesses) and accordingly may create personal content profiles. The personal content profile may be used to calibrate the weight assigned to content during runtime analysis to improve accuracy and tailor weighted risk analysis for specific user characteristics.

In some embodiments, the security engines 530, security policies 535 and security data 540 may enable bypassing the mobile security system 345. The security policy 535, set by the security administrator 325, may include a special attribute to force network connection through the mobile security system 325 when outside the trusted enterprise 340. Thus, if this attribute is set "on," when a mobile device 310 attempts to connect to the internet 330 without the mobile security system 345 and not from within the trusted enterprise 340, all data transfer connections including LAN connection, USB-net, modem, Bluetooth, WiFi, etc. may be closed. The mobile device 310 may be totally isolated and unable to connect to any network, including the internet 330.

Figure 6:
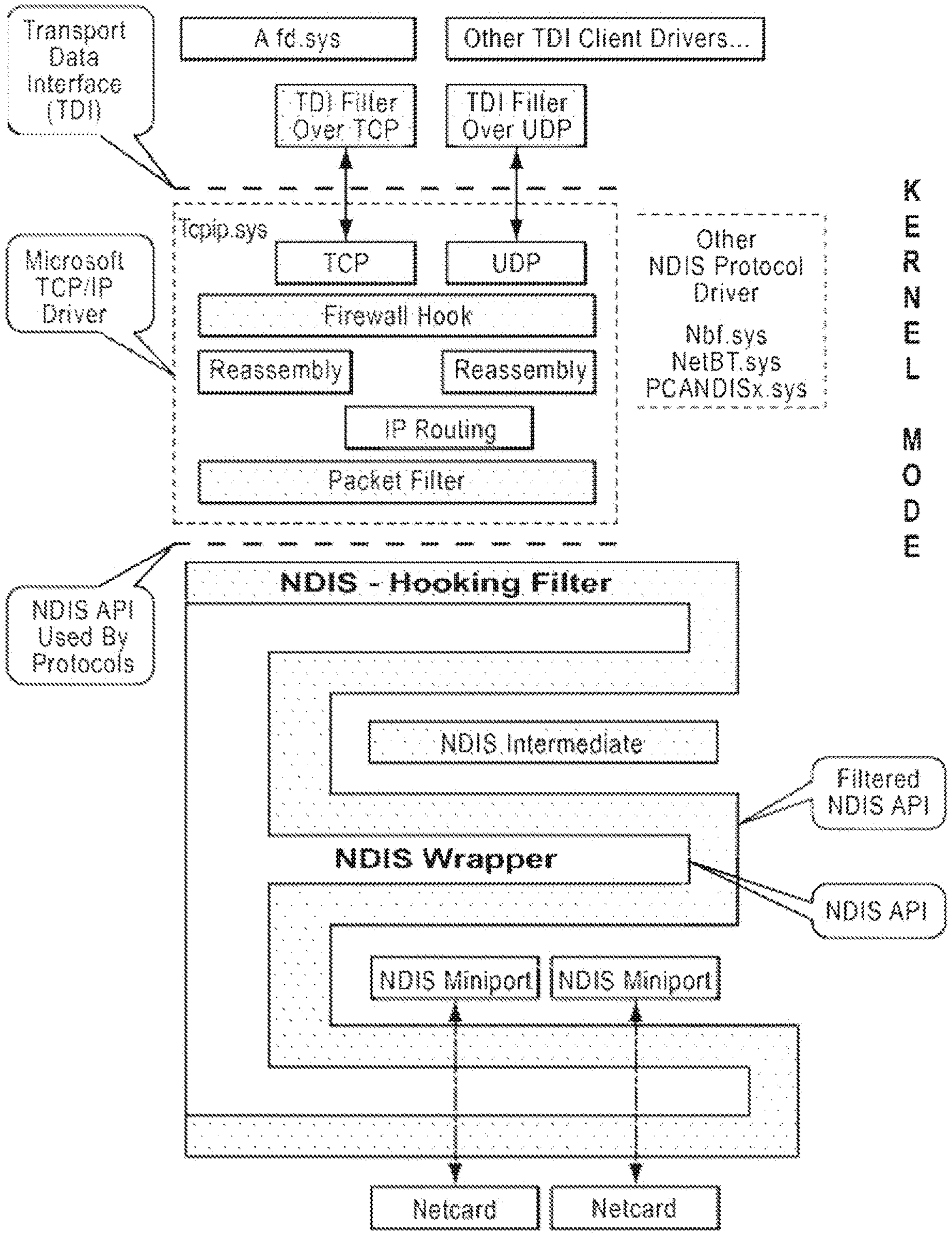
FIG. 6 is a block diagram illustrating details of the mobile security system in accordance with a Microsoft Window's embodiment.

In one embodiment, to enable this, when first connecting the mobile security system 345 to the mobile device 310 using for example the USB cable (for both power and USB connection creation), the USB plug & play device driver will be sent into the mobile device 310. The installed driver may be "Linux.inf" which allows a USB-net connection for the mobile security system 345. This connection allows the mobile security system 345 to access the internet 330 via the USB port and using the mobile device 310 network connection plus additional code ("the connection client"). In a Windows example, the connection client may be installed at the NDIS level of the mobile device 310 above all the network interface cards of every network connection as shown in FIG. 6. The implementation will be as an NDIS Intermediate (IM) Driver or NDIS-Hooking Filter Driver. Both implementations may be at the kernel level, so that an end user cannot stop or remove it. When starting the mobile device 310, the connection client may attempt to connect to the security administrator 325 or the network security system 320 locally within the trusted enterprise 340. If the node is not found (finding via VPN is considered as not found in local LAN), the connection client will assume it is working from outside the trusted enterprise 340 and expects to find the mobile security system 345 connected, e.g., via USB-net or other connection mechanism. If the mobile security system 345 is not found, the connection client may avoid any communication to any network connection. By a policy definition, this behavior can be modified to allow communication to the enterprise 340 via VPN installed in the mobile device 310. Similarly, in case of a mobile device system 345 failure, all traffic may be disabled, except for the VPN connection into the enterprise 340.

It will be appreciated that NDIS is one possible implementation of intercepting traffic at the kernel level. For example, in another embodiment, the system may hook Winsock or apply other ways that may be in future Windows versions.

In an embodiment where the mobile security system 345 supports multiple mobile devices 310, the security engines 530, security policies 535 and security data 540 may be different for each mobile device 310 (e.g., based on for example user preferences or IT decision). Alternatively, it can apply the same engines 530, policies 535 and data 540 for all connected devices 310.

The remote management module 550 enables communication with security administrator 325 (and/or other security administrators), and enables local updating of security engines 530, security policies 535, security data 540 including signatures and other applications. In one embodiment, modification to the security policies 535 and data 540 can be done by the security administrator 325 only. The remote management module 550 of the mobile security system 345 may receive updates from an update authorities device (UAD), e.g., on the security administrator 325 via a secured connection. A UAD may operate on an update server at a customer IT center located on the internet 330 to forward updates to mobile security systems 345 that possibly do not belong to an enterprise 540 in charge of managing updates. A UAD may operate on a mobile security system 345. Security engine 530 updates may modify the antivirus engine DLL, etc. OS and security application updates may be implemented only from within the enterprise 540 while connecting to the security administrator 325 and via an encrypted and authenticated connection.

The security administrator 325 can modify URL black and white lists for remote support to traveling users. In case of false positives, the security administrator 325 may allow access to certain URLs, by bypassing the proactive heuristics security but still monitoring by firewall, antivirus, IPS/IDS, etc. Additional remote device-management features may enable the security administrator 325 to perform remote diagnostics, access local logs, change configuration parameters, etc. on the mobile security system 345. The security administrator 325 may delegate tasks to a helpdesk for support.

Figure 7:
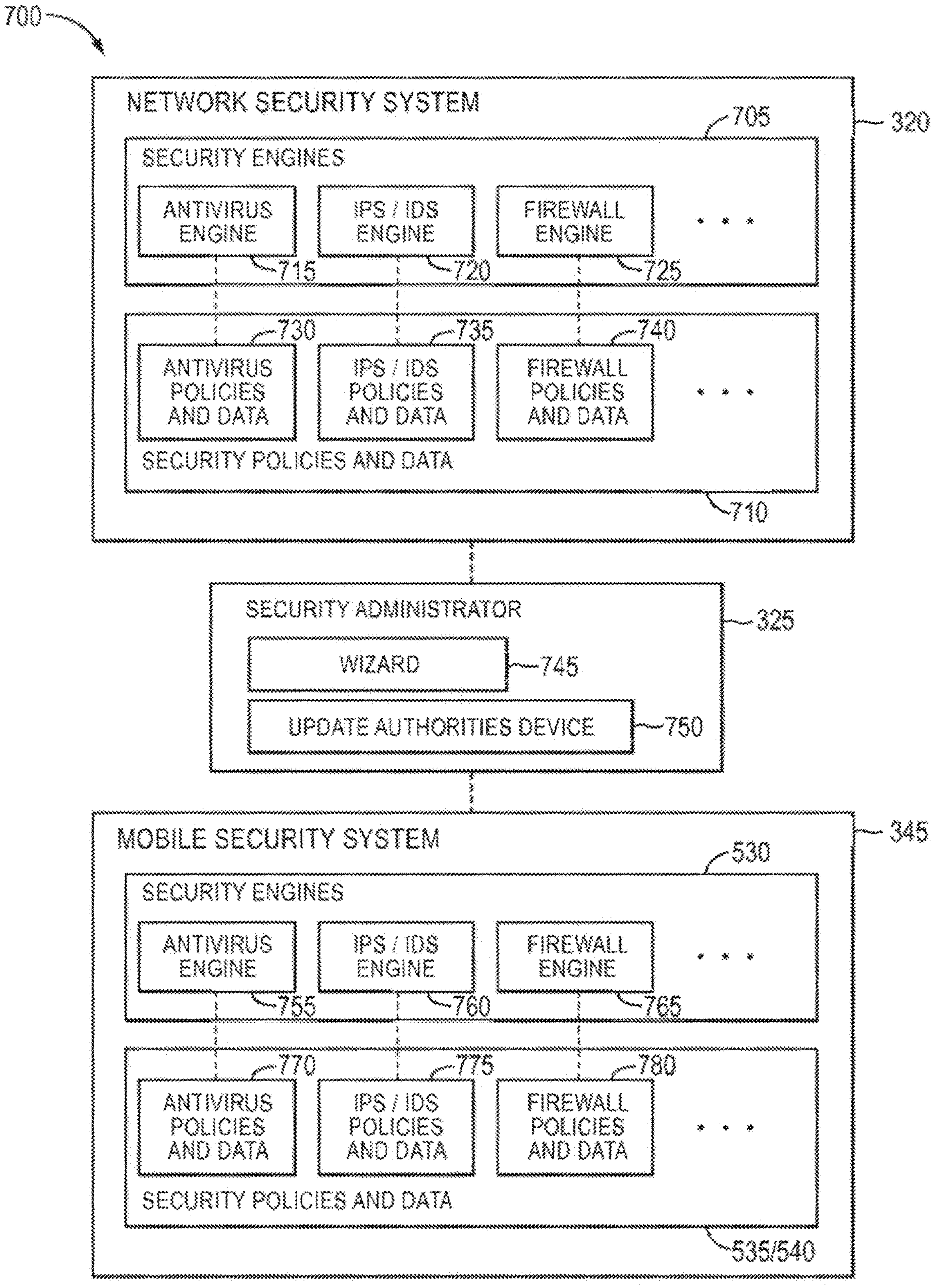
FIG. 7 is a block diagram illustrating details of a smart policy updating system in accordance with an embodiment of the present invention.

The remote management module 550 may communicate with a wizard (e.g., wizard 745), which may be on the security administrator 325, as illustrated in FIG. 7, or on another system. Details of the wizard 745 and details of the communication schemes between the remote management module 550 and the wizard 745 are described below with reference to FIG. 7.

The distribution module 555 enables distribution of updates, e.g., security policy 535 updates including rule updates, security data 540 updates including signature updates, security engine 530 updates, application/OS updates, etc. by the mobile security system 345 to N other mobile security systems 345. A routing table identifying the N other mobile security systems 345 to whom to forward the updates may be provided to the distribution module 555 to enable system 345 to system 345 communication. Updates may be implemented according to policies set by the security administrator 325. When forwarding updates, the distribution module 555 acts as a UAD.

Each mobile security system 345 may obtain its routing table with security information updates, periodically, at predetermined times, upon login, etc. The routing tables may be maintained on a server, e.g., the security administrator 325 or another mobile security system 345. In one embodiment, the mobile security systems 345 may contact the server to retrieve the routing tables. Alternatively, the server may push the routing tables to the mobile security systems 345.

Figure 9:
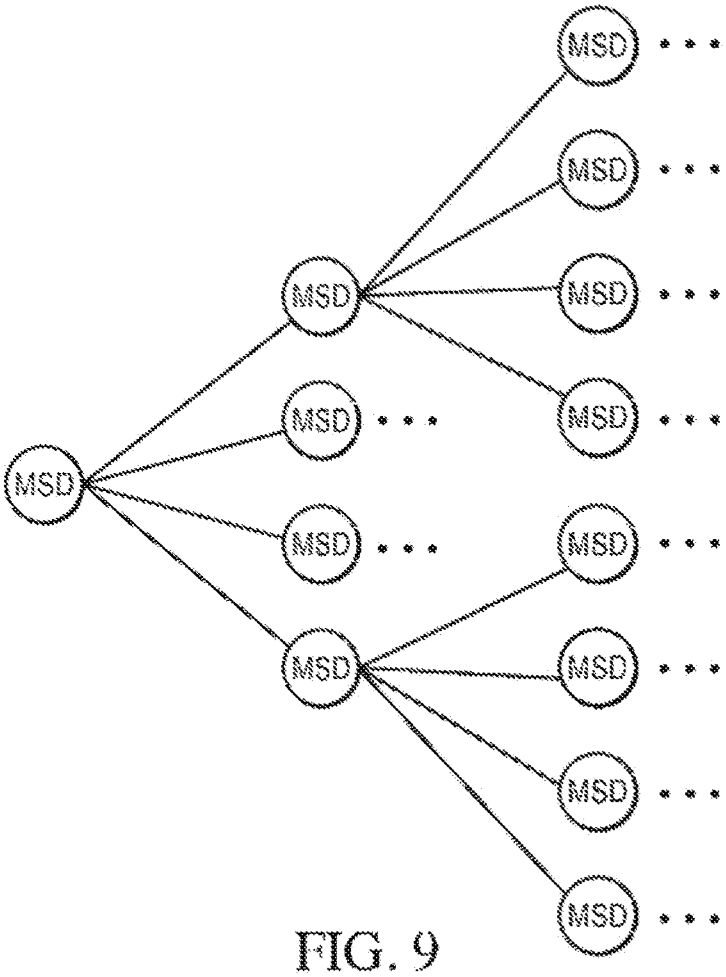
FIG. 9 is a block diagram illustrating details of the communication technique for spreading security code to the mobile security systems.

The distribution module 555 may enable rapid updates as shown in FIG. 9. Currently, all commercial antivirus products available do not update devices faster than viruses spread. To assure that a new virus attack does not spread faster than for example signature updates, each mobile security system 345 may be an active UAD. In one embodiment, as shown in FIG. 9, each mobile security system 345 is responsible for forwarding the signature updates to four other devices 345. As one skilled in the art will recognize all devices 345 need to forward to the same number of other devices 345. Multiple devices 345 may be responsible for forwarding to the same device 345. When necessary, offline devices 345 being activated may poll the server, e.g., the security administrator 325, for routing table updates. Many other updating techniques are also possible.

The backup module 560 may constantly backup image and changes of the boot sector and system files of the mobile device 310 into the flash memory 520 or into another persistent memory device. That way, in case of major failure, including a loss of the system or boot sector of the mobile device 310, the mobile security system 345 may be identified as a CD-ROM during reboot and may launch the backup module (or separate program) to restore the boot sector and system files on the mobile device 310, thereby recovering the mobile device 310 without the need for IT support. In an embodiment where the network security system 345 supports multiple mobile devices 310, the backup module 560 may contain separate boot sector and system files for each of the mobile devices 310, if different.

FIG. 7 is a block diagram illustrating details of a smart policy updating system 700 in accordance with an embodiment of the present invention. System 700 includes the security administrator 325 coupled to the network security system 320 and to the mobile security system 345. The network security system 320 includes security engines 705, including an antivirus engine 715, an IPS/IDS engine 720, a firewall engine 725, and other security engines. The network security system 320 also includes security policies and data 710, including antivirus policies and data 730, IPS/IDS policies and data 735, firewall policies and data 740, and other policies and data. Similarly, the mobile security system 345 includes an antivirus engine 755, an IPS/IDS engine 760, a firewall engine 765, and other engines. The mobile security system 345 also includes security policies and data 535/540, including antivirus security policies and data 770, IPS/IDS security policies and data 775, firewall security policies and data 780, and other security policies and data.

The security administrator 325 includes a wizard 745 for enabling substantially automatic initial and possibly dynamic setup of the security engines 530, security policies 535 and security data 540 on the mobile security system 345. In one embodiment, the wizard 745 may automatically load all security engines 705 and policies and data 710 of the network security system 320 as the security engines 530 and policies and data 535/540 on the mobile security system 345. In another embodiment, the wizard 745 may include all security engines 705 and policies and data 710 except those known to be irrelevant, e.g., those related to billing software used by accounting, those relating to web software running only on the web servers, etc. In another embodiment, the engines 530 would need to be loaded by an IT manager, and would not be loaded automatically by the wizard 745.

In one embodiment, the wizard 745 may determine whether the mobile security system 345 requires a particular security engine 530, e.g., an antivirus engine 755, IPS/IDS engine 760, firewall engine 765, etc. If so determined, then the wizard 745 would load the engine 530 onto the mobile security system 345. The wizard 745 would then determine which policies and data sets, e.g., some for antivirus engine 755, some for the IPS/IDS engine 760, some for the firewall engine 765, etc. are important to the mobile security system 345. The wizard 745 will then determine which of the antivirus policies and data 730 on the network security system 320 are relevant to the antivirus policies and data 770 on the mobile security system 345, which of the IPS/IDS policies and data 735 on the network security system 320 are relevant to the IPS/IDS policies and data 775 on the mobile security system 345, which of the firewall policies and data 740 on the network security system 320 are relevant to the firewall policies and data 780 on the mobile security system 345, and which of the other policies and data on the network security system 320 are relevant to the policies and data on the mobile security system 345. As stated above, the wizard 745 may determine that all security engines 705 or just a subset are needed on the mobile security system 345. The wizard 745 may determine that all policies and data 710 for a given engine type or just a subset should be forwarded. The wizard 745 may determine which relevant policies and data 710 should be forwarded to the mobile security system 345 based on rules developed by an IT manager, based on item-by-item selection during the setup procedure, etc. Alternative to the wizard 745, an IT manager can setup the engines 530 and policies and data 535/540 on the mobile security system 345 without the wizard 745.

The security administrator 325 may also include an update authorities device 750. The update authorities device 750 may obtain security system updates (e.g., signature updates) and may send the updates to the network security system 320 and to the mobile security system 345. One skilled in the art will recognize that the updates to the network security system 320 and the updates to the mobile security system 345 need not be the same. Further, the update authorities device 750 may obtain the updates from security managers, security engine developers, antivirus specialists, etc. The update authorities device 750 may forward the updates to all network security systems 320 and all mobile security systems 345, or may forward routing tables to all mobile security systems 345 and the updates only to an initial set of mobile security systems 345. The initial set of mobile security systems 345 may forward the updates to the mobile security systems 345 identified in the routing tables in a P2P manner, similar to the process illustrated in FIG. 9. As stated above, each mobile security system 345 operating to forward updates is itself acting as an update authorities device 750.

Other applications may be included on the mobile security system 345. For example, add-on applications for recurring revenue from existing customers may include general email, anti-spam, direct and secured email delivery, information vaults, safe skype and other instant messaging services, etc.

- Email Security and Anti-spam—implementation of mail relay on mobile security systems 345 (including the web security engine above) and a local spam quarantine (based on SendMail or similar process) may implement a complete mail security suite (SMTP and POP3) including anti-spam with real time indexing (via online web spam quarries). Users may have access to the quarantine to review spam messages, release messages, modify and custom spam rules, etc., via a web interface.

- Direct and Secured Email Delivery based on mail relay will allow the mobile security system 345 to send user email directly from one mobile security system 345 to another mobile security system 345 without using in route mail servers. This allows corporate users to send emails that need not travel in the internet, thus leaving trace and duplicates on different unknown mail servers in route. This combined with the ability to use a secured pipe between two mobile security systems is valuable to corporations. Without such methodology, people could trace emails exchange without accessing to the enterprise's mail server, by tracking down copies in intermediate mail servers that were used to deliver the messages.
- Information Vault—Application to encrypt and store end user information on the mobile security system 345 may be available only to authorized users via a web interface and a web server implemented on every mobile security system 345 (e.g., BOA, Apache, etc.)
- Safe Skype and Other IM—implementing an instant messaging client on the mobile security system 345 can guarantee that the instant messaging system or P2P application has no access to data on the mobile device 310. Adding a chipset of AC/97 to provide a sound interface on the mobile security system 325 could allow users to talk and receive calls directly from/to the mobile security system 325.

Although not shown, a small battery may be included with the mobile security system 345. This battery may be charged by the USB connection during runtime or using the power adapter at any time. The battery may guarantee proper shutdown, e.g., when user disconnects the USB cable from the mobile security system 345. It will be signaled by the system which will launch applications and system shutdown. This will ensure a proper state of the file system and flashing open files buffers.

A multi-layered defense and detection abilities is required. This may be done by a special code that is constantly monitoring the scanning result by different systems (antivirus, IDS/IPS, firewall, antispyware, URL category, etc.) and at different levels to build a puzzle and identify an attack even if its not recognized by each of the individual subsystems. By doing this, the mobile security system 345 will maintain and in some cases even improve the security level provided within the enterprise 540.

One available benefit of the mobile security system 345 is its ability to enforce the policy of the enterprise 540 on the end user while they are traveling or working from home. Since the mobile security system 345 uses similar security engines and policy as when connected from within the enterprise 540 and since the end user cannot access the internet 330 without it (except via VPN connection into the enterprise 540), IT may be capable of enforcing its security policy beyond the boundaries of the enterprise 540. The OS may be under the entire supervision of IT, while the mobile security system 345 OS acts as an end user OS under his control. This resolves the problems of who controls what and how security and productivity face minimal compromise.

A standalone version of the mobile security system 345 may offer the same functionality, and may provide a local management interface via web browser. Attractive to home users and small offices that lack an IT department, the mobile security system 345 enables the end user to launch a browser, connect to the mobile security system 345, set the different policies (update policy, security rules, etc.) including modifying the white and black URL lists, etc. There is also an opportunity to provide end users with a service of remote management of the mobile security systems 345 by subscription.

Figure 10A:
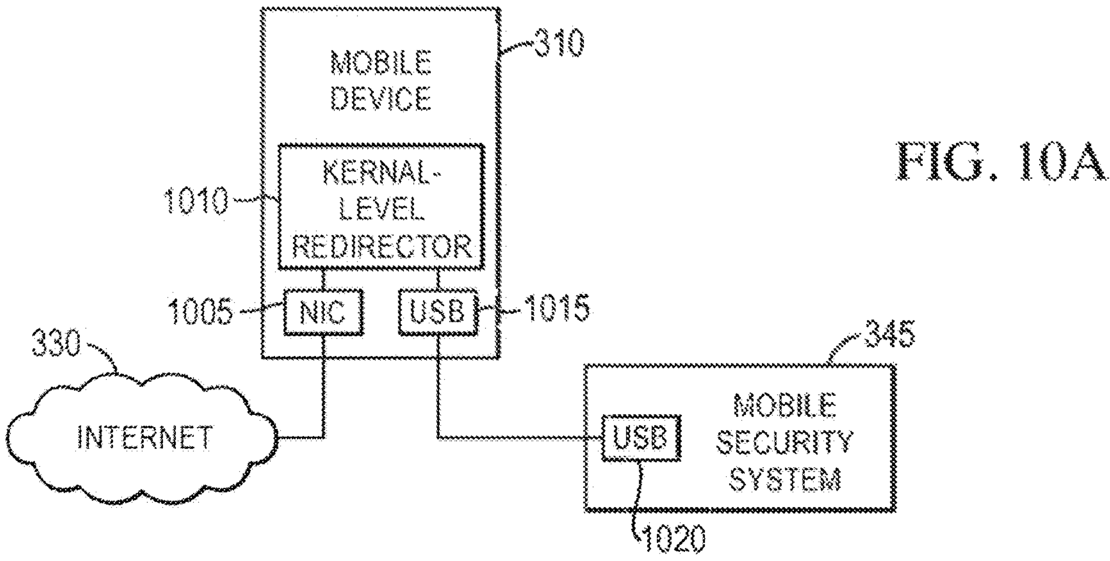
FIGS. 10A-10C are block diagrams illustrating various architectures for connecting a mobile device to a mobile security system, in accordance with various embodiments of the present invention.
Figure 10B:
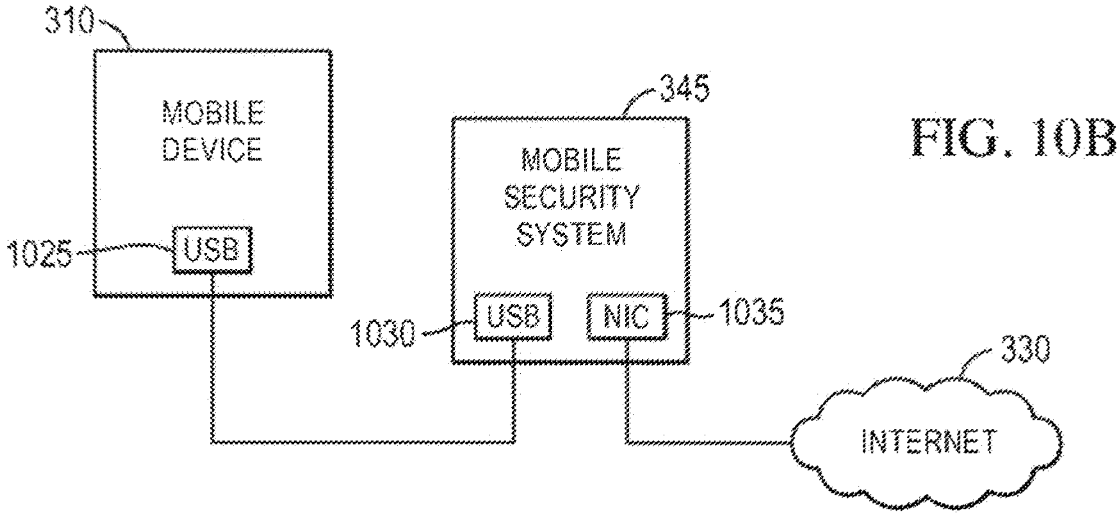
Figure 10C:
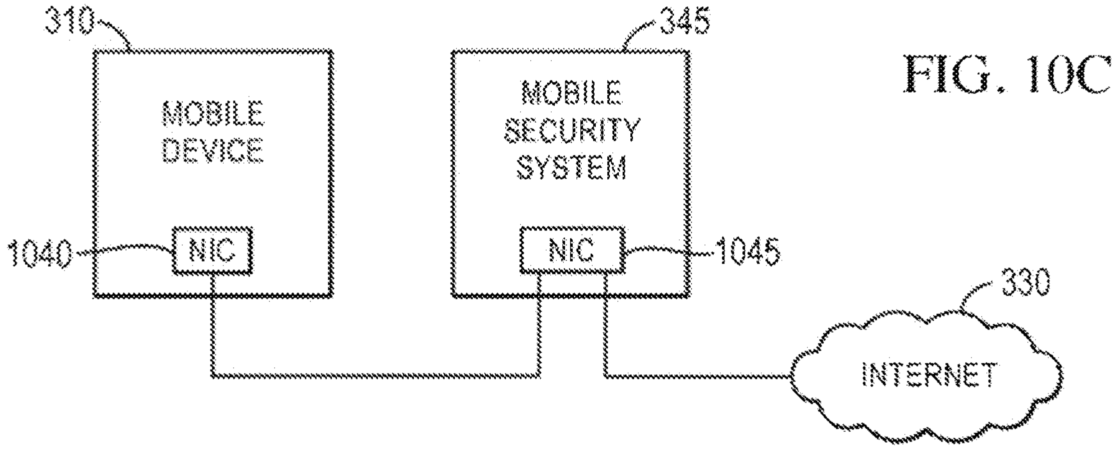

FIGS. 10A, 10B and 10C illustrate three example architectures of connecting a mobile security system 345 to a mobile device 310, in accordance with various embodiments of the present invention. In FIG. 10A, the mobile device 310 is coupled to the mobile security system 345 via USB connections 1015 and 1020 and is coupled to the internet 330 via a NIC card 1005. The mobile device 310 receives internet traffic from the internet 330 via its NIC card 1005. A kernel-level redirector 1010 (e.g., via NDIS, Winsock, etc.) on the mobile device 310 automatically redirects the internet traffic via the USB connections 1015 and 1020 to the mobile security system 345, which scans, cleans and returns the cleaned internet traffic to the mobile device 310 via the USB connections 1015 and 1020. In FIG. 10B, the mobile device 310 is coupled to the mobile security system 345 via USB connections 1025 and 1030. The mobile security system 345 includes a NIC card 1035 for receiving internet traffic from the internet 330. The mobile security system 345 scans, cleans and forwards the internet traffic via the USB connections 1025 and 1030 to the mobile device 310. In FIG. 10C, the mobile device 310 is coupled to the mobile security system 345 via NIC cards 1040 and 1045. The mobile security system 345 receives internet traffic from the internet 330 via its NIC card 1045. The mobile security system 345 scans, cleans and forwards the internet traffic wirelessly via the NIC cards 1040 and 1045 to the mobile device 310. Other connection architectures are also possible. Although not depicted in FIG. 10, those skilled in the art will appreciate that the mobile security system 345 may be communicatively coupled to any communication path, including, in some examples, an internal computer bus, a computer local bus, a memory bus, a network bus, a hard disks bus, a serial bus, or a parallel bus.

Figure 11:
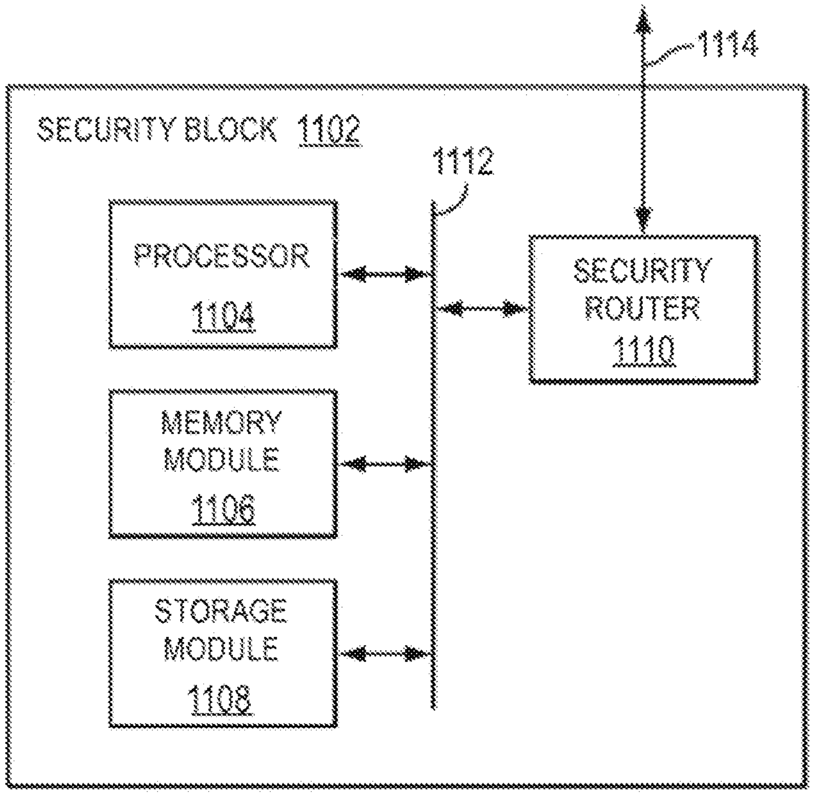
FIG. 11 is a block diagram illustrating details of a security block in some embodiments of the present invention.

FIG. 11 is a block diagram illustrating details of a security block 1102 in some embodiments of the present invention. The security block 1102 comprises a processor 1104, a memory module 1106, a storage module 1108, and a security router 1110 coupled to a bus 1112. The processor 1104 is configured to execute instructions (e.g., programs). The security block 1102 may comprise the mobile security system 345 discussed with respect to FIG. 3 herein.

The security block 1102 may reside in a digital device (e.g., any device with memory and a processor). In various embodiments, the security block 1102 may reside in flash memory devices, communication chips, or processors (e.g., network processors, general purpose processors, communication processors, or DSPs). The security block 1102 may comprise instructions 1116 (e.g., security instructions such as for security applications) associated with a variety of programs (e.g., applications) including a firewall, network address translator (NAT), VPN client, intrusion detection and prevention system, HTTP proxy, FTP proxy, POP3 proxy, SMTP proxy, anti-virus program, anti-spyware program, anti-phishing program, anti-spam program, URL CAT, L-8 security engine, MLA security agent, DRM application, anti-leakage program, malicious content filter, multilayered security monitor, Java monitor, bytecode monitor and/or data access client.

In various embodiments, the processor 1104 is configured by the instructions 1116 to analyze data for the presence of malicious code (e.g., malware). The processor 1104 may comprise circuitry capable of processing the instructions 1116. In some embodiments, the processor 1104 is virtualized. In other embodiments, the processor 1104 comprises a CPU, DSP, FPGA, or any processing unit.

The memory module 1106 includes memory (e.g., RAM, ROM, preboot flash 520, or a ram cache). The instructions 1116 may be loaded into the memory module 1106.

The storage module 1108 is any storage configured to retrieve and store data. Some examples of the storage module 1108 are flash media, hard drives, optical drives, and/or magnetic tape. In some embodiments, the security block 1102 includes a memory module 1106 in the form of RAM and a storage module 1108 in the form of flash memory. Both the memory module 1106 and the storage module 1108 comprise computer readable media which may store instructions or programs that are executable by a computer processor including the processor 1104.

The security router 1110 is any device that receives data over link 1114. In some embodiments, the security router 1110 is coupled to a network (e.g., internet 130) via the link 1114. Further, the security router 1110 may also support wired and/or wireless communication (e.g., 802.11 a/b/g/n, WiMax).

The security block 1102 as well as one or more of the components of the security block 1102 (e.g., processor 1104, the memory module 1106, the storage module 1108, and the security router 1110) may be virtualized. Further, those skilled in the art will appreciate that the security block 1102 may be a part of a larger digital device. In one example, the processor 1104 used by the security block 1102 may be the same processor used by the digital device.

Further, the memory module 1106 may comprise all or a portion of RAM memory within a digital device with one or more other components. In one example, a digital device may comprise 2 gigabytes of RAM memory. Some or all of that memory may be shared by the CPU of the digital device and the memory module 1106. In one example, the CPU scans data, cleans data, analyzes data, or otherwise protects the digital device from malware.

Similarly, the storage module 1108 may comprise all or a portion of the storage of the digital device. In one example, the digital device may comprise a one terabyte hard drive. Some or all of the one terabyte hard drive may be shared with the storage module 1108. In one example, the storage of the digital device stores instructions 1116.

Those skilled in the art will appreciate that the security block 1102 may comprise more processors, modules, security routers, and/or other components than those depicted in FIG. 11. Further, the security block 1102 may comprise fewer modules than those depicted in FIG. 11. For example, multiple functions may be performed by a single module.

Figure 12:
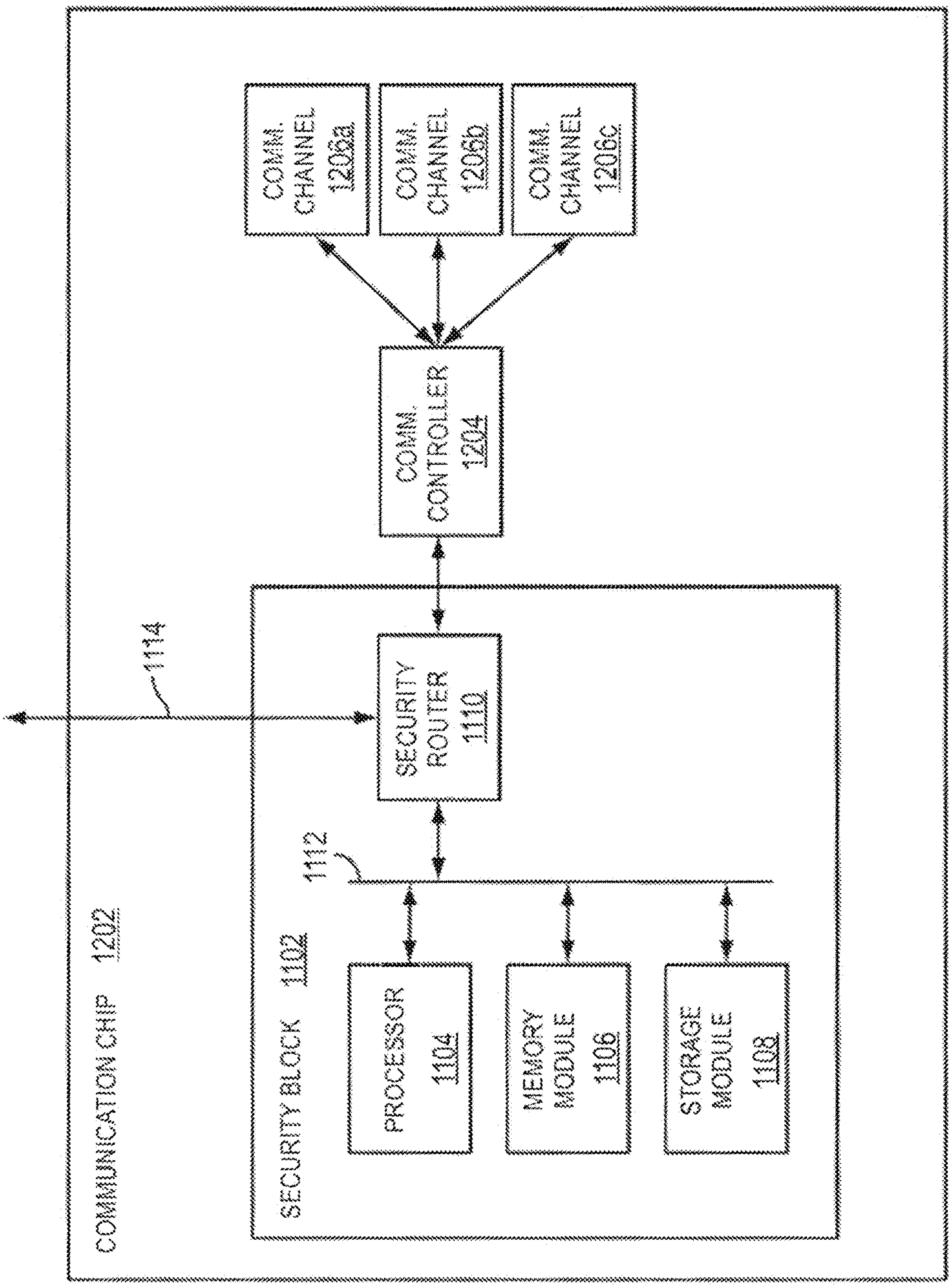
FIG. 12 is a block diagram illustrating a security block on a communication chip in some embodiments of the present invention.

FIG. 12 is a block diagram illustrating a security block 1102 on a communication chip 1202 in some embodiments of the present invention. The communication chip 1202 comprises the security block 1102 operatively connected to a communication controller 1204 which, in turn, is operatively connected to communication channels 1206*a*-1206*c*. The communication chip 1202 may be within any digital device such as, for example, a computer, laptop, cell phone, or any digital device in communication with another digital device. Further, the communication chip 1202 may be within or in communication with, for example, a network processor, communication controller, NAS processor, router processor, or wireless communication processor.

In various embodiments, a digital device comprises a processor such as a CPU. The processor 1104 may comprise all or a portion of the processor of the digital device. In one example, the communication chip 1202 may be in communication with the processor within the digital device. The processor 1104 within the security block 1102 may comprise all or a portion of the processor within a digital device (e.g., the digital device and the security block 1102 share the same processor).

In various embodiments, the communication chip 1202 receives data to be distributed over one or more communication channels (e.g., comm. channel 1206*a*-1206*c*). Data may also be received from the communication channels to be provided over link 1114 (e.g., to a network in communication with the communication chip 1202).

In various embodiments, untrusted data is received by the communication chip 1202 from a network (not depicted) over the link 1114. The security router 1110 of the security block 1102 may receive the data from the link 1114. The processor 1104 may process the untrusted data using instructions associated with one or more security programs. The instructions may be loaded in the memory module 1106. In one example, the instructions comprise an antivirus program that instructs the processor 1104 to scan the untrusted data for malware. In some embodiments, once the process by the processor 1104 is completed, the security router 1110 will provide the trusted data (i.e., data that has been processed by the processor 1104 using instructions associated with the one or more security programs) to the communication controller 1204. The communication controller 1204 may provide the trusted data to one or more communication channels (e.g., communication channels 1206*a*-1206*c*). In one example, the communication controller 1204 functions as a standard communication controller on a standard communication chip when data is received.

In various embodiments, the processor 1104 executes one or more various security programs while processing the untrusted data. These one or more security programs include, for example, a firewall, network address translator (NAT), VPN client, intrusion detection and prevention system, HTTP proxy, FTP proxy, POP3 proxy, SMTP proxy, anti-virus program, anti-spyware program, anti-phishing program, anti-spam program, URL CAT, L-8 security engine, MLA security agent, DRM application, anti-leakage program, malicious content filter, multilayered security monitor, Java monitor, bytecode monitor and/or data access client.

In one example, the processor 1104 executes a firewall that prevents the security router 1110 from routing data to the communication controller 1204. In another example, the processor 1104 executes an antivirus program that scans and removes viruses from untrusted data. The cleaned data (i.e., trusted data) may be provided by the security router 1110 to the communication controller 1204.

Further, in some embodiments, untrusted data may be received by the communication chip 1202 over one or more of the communication channels 1206*a*-1206*c*. The untrusted data may then be received by the communication controller 1204 and provided to the security router 1110. The processor 1104 then processes the untrusted data with instructions associated with one or more security programs to produce trusted data. The security router 1110 may then transmit the trusted data over the link 1114.

Those skilled in the art will appreciate that the communication chip 1202 may comprise any number of components beyond those displayed in FIG. 12. Further, those skilled in the art will appreciate that the communication chip 1202 may comprise fewer components than those displayed in FIG. 12. For example, the communication chip 1202 may include only one or two communication channels. Further, multiple functions may be combined into one or more components.

Figure 13:
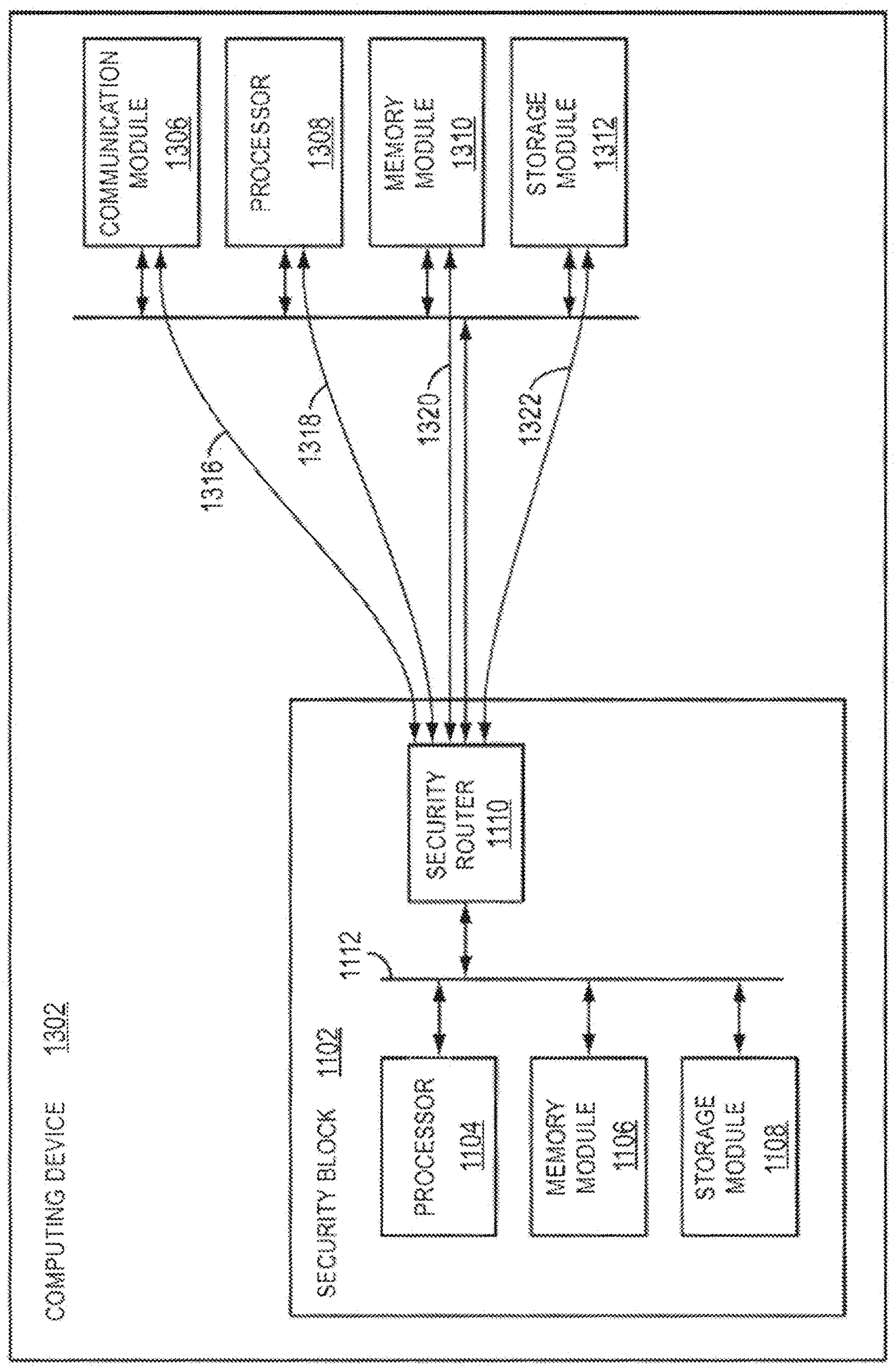
FIG. 13 is a block diagram illustrating a security block on a computing device in some embodiments of the present invention.

FIG. 13 is a block diagram illustrating a security block 1102 on a computing device 1302 in some embodiments of the present invention. The computing device 1302 comprises the security block 1102 operatively connected to an internal or local bus 1304 which, in turn, is operatively connected to a communication module 1306, a processor 1308, a memory module 1310, and a storage module 1312. Data may flow between the internal or local bus 1304 and the communication module 1306, processor 1308, memory module 1310, and storage module 1312 via paths 1316, 1318, 1320, and 1322, respectively. Paths 1316, 1318, 1320, and 1322, represent different data flows between the internal or local bus 1304 and the communication module 1306, processor 1308, memory module 1310, and storage module 1312. Each path 1316, 1318, 1320, and 1322 may flow over one or more connections between the security router 1110 and the internal or local bus 1304.

In various embodiments, the computing device 1302 is modified to route data and content between the security block 1102 and the communication module 1306, the processor 1308, the memory module 1310, and the storage module 1312. In one example, the computing device 1302 performs security checks and performs malicious content removal on the fly. In various embodiments, the computing device 1302 comprises a PC, desktop PC, Mobile Phone, Server, network processor, communication controller, NAS processor, router processor, wireless communication processor, or digital device etc.

In various embodiments, the communication module 1306 is any interface configured to communicate data between the computing device 1302 and a digital device. The processor 1308 may be similar to the processor 1104. In one example, the processor 1308 is virtualized. In other examples, the processor 1306 comprises a CPU, DSP, FPGA, or any processing unit. In some embodiments, the processor 1306 and the processor 1104 may be the same processor.

The memory module 1310 may be similar to the memory module 1106. In one example, the memory module 1310 includes memory (e.g., RAM, ROM, preboot flash 520, or a ram cache). In some embodiments, the memory module 1310 and the memory module 1106 may be the same memory.

The storage module 1312 may be similar to the storage module 1108. In one example, the storage module 1312 may be any storage configured to retrieve and store data. Some examples of the storage module 1312 are flash media, hard drives, optical drives, and/or magnetic tape. In some embodiments, the storage module 1312 and the storage module 1108 may be the same storage.

Those skilled in the art will appreciate that the computing device 1302 may comprise more or less blocks, processors, and modules, than depicted in FIG. 13. In some embodiments, the functions of the modules depicted may be combined into fewer modules. Functions of one or more modules may also be performed by any number of modules. Further, it will be appreciated that the computing device 1302 may include a number of functions not identified in the drawings. In one example, the computing device 1302 may comprise a display module configured to display images to a user. In another example, the computing device 1302 may comprise an I/O module configured to communicatively couple a keyboard, or any input or output device to the internal or local bus 1304.

Figure 14:
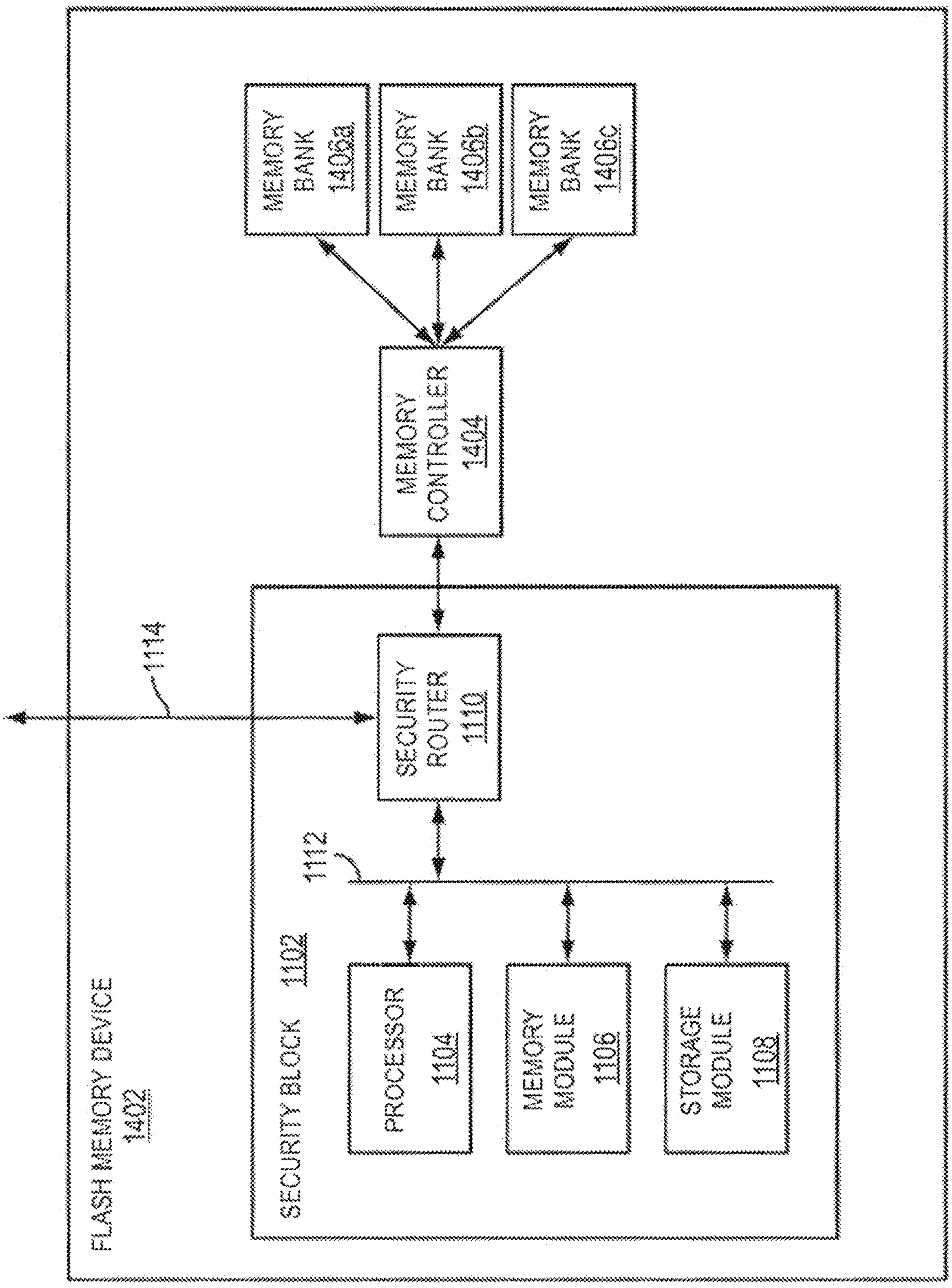
FIG. 14 is a block diagram illustrating a security block on a flash memory device in some embodiments of the present invention.

FIG. 14 is a block diagram illustrating a security block 1102 on a flash memory device 1402 in some embodiments of the present invention. The flash memory device 1402 may comprise the security block 1102 in operative communication with the memory controller 1404 which is operatively connected to the memory banks 1406*a*-1406*c*. The flash memory device 1402 may be in any digital device, (e.g., a computer, laptop, PDA, or cell phone) or memory device (e.g., memory stick or flash drive).

In various embodiments, the flash memory device 1402 receives data to be stored in the memory banks 1406*a*-1406*c*. The memory banks 1406*a*-1406*c* may comprise any kind of flash memory, including, but not limited to, NAND or NOR flash. Further, the memory banks 1406*a*-1406*c* may comprise different kinds of flash memory (e.g., bank 1406A may comprise NAND flash memory and bank 1408B may comprise NOR flash memory).

In various embodiments, untrusted data is received by the flash memory device 1402 from a network or digital device (not depicted) over a memory data bus operatively coupled to the link 1114. In one example, the security router 1114 intercepts untrusted data associated with a write command. The security router 1110 of the security block 1102 may receive the data from the link 1114. The processor 1104 may process the untrusted data using instructions associated with one or more security programs. In some embodiments, once the process by the processor 1104 is completed, the security router 1110 will provide the trusted data to the memory controller 1404. The memory controller 1404 may then function as a standard memory controller and provide the trusted data to one or more memory banks (e.g., memory banks 1406*a*-1406*c*).

Further, in some embodiments such as when a read command is executed to read data from the memory bank(s), untrusted data may be received by the memory controller 1404 from the media banks 1406*a*-1406*c* and provided to the security router 1110. The processor 1104 then processes the untrusted data with instructions associated with one or more security programs to produce trusted data. The security router 1110 may then transmit the trusted data over the link 1114.

Those skilled in the art will appreciate that the flash memory device 1402 may comprise any number of components beyond those displayed in FIG. 14. Further, those skilled in the art will appreciate that the flash memory device 1402 may comprise fewer components than those displayed in FIG. 14. For example, the flash memory device 1402 may include only one or two memory banks. Further, multiple functions may be combined into one or more components.

Although FIG. 14 depicts three memory banks 1406*a*-1406*c*, the flash memory device 1402 may comprise any number of memory banks. In one example, the flash memory device 1402 includes only one memory bank. In another example, the flash memory device 1402 may comprise a single module of flash memory that is logically divided into one or more memory banks.

In some embodiments, the one or more of the memory banks 1406*a*-1406*c* are shared by the memory module 1106 and/or the storage module 1106. In one example, a portion of the memory bank 1406*a* may be protected (e.g., a portion of memory in the memory bank 1406*a* is read-only). The protected portion of memory within memory bank 1406*a* may function as the memory module 1106 and/or the storage module 1108 (e.g., a place in memory in which instructions associated with one or more security programs are stored and/or loaded).

Those skilled in the art will appreciate that device disclosed in FIG. 14 may not be limited to flash memory but may process data between a processor and any memory storage, including, for example, RAM, a hard drive, CD ROM, or any other kind of computer readable storage.

Figure 15:
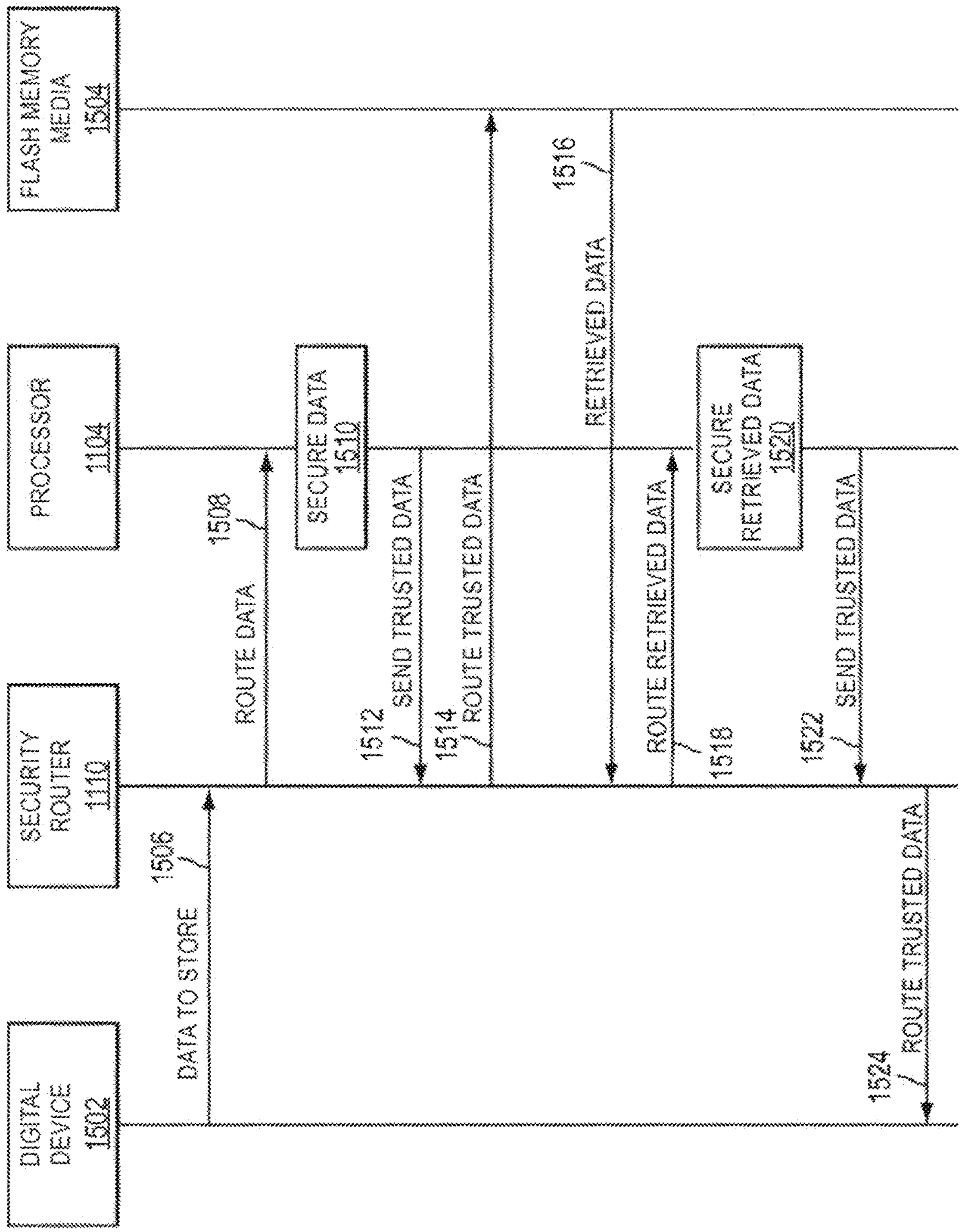
FIG. 15 is a block diagram illustrating the flow of data between a digital device and flash memory in some embodiments of the present invention.

Although FIGS. 14 and 15 depict a communication chip and a flash memory, respectively, those skilled in the art will appreciate that the security router 1110 may be placed within the flow of data between any source and any destination. The data is processed by the processor 1104 before the data is allowed to continue to the destination. The destination may be, for example, another digital device, data storage (e.g., a hard drive), or RAM. For example, in some embodiments, the security router 1110 may provide trusted data for storage over a network (e.g., to a storage area network) or for storage with a storage device with which the security router 1110 is communicatively coupled.

FIG. 15 is a block diagram illustrating the flow of data between a digital device 1502 and flash memory media 1504 in some embodiments of the present invention. In various embodiments, the flash memory media 1504 may be contained in a thumb drive such as a memory stick coupled via a USB port. The digital device 1502 may be any device with a processor and memory including, for example, a computer or laptop. In one example, a user plugs a flash device containing the flash memory media 1504 into a USB port of the digital device 1502. The user may then proceed to store data on the flash memory media 1504. Prior to storing the data on the flash memory media 1504, the data may be processed using one or more security programs. Similarly, prior to data being retrieved from the flash memory media 1504 by the digital device 1502, the data may be processed using the one or more security programs.

In some embodiments, once the data is trusted (e.g., processed using the security programs prior to storage), the trusted data is retrieved by the digital device 1502 and further processing is not performed. In one example, the security router 1110 is configured to make the determination whether received data is trusted or untrusted prior to processing.

In step 1506, the security router 1110 receives untrusted data from the digital device 1502. In one example, data to be stored in the flash memory media 1504 is intercepted by the security router 1110. The security router 1110 may then identify the data as untrusted. In one example, the security router 1110 is configured to determine the source of the data and whether the data has been previously processed with one or more security programs. In step 1508, the security router 1110 provides the data to the processor 1104. In one example, the security router 1110 provides only untrusted data for processing by the processor 1104.

In step 1510, the processor 1104 secures the data by processing the untrusted data using instructions associated with one or more security programs. In some embodiments, the untrusted data may be quarantined or blocked from being stored in the flash memory media 1504. In one example, malware, such as a virus, is found in the untrusted data. Information regarding the infection may be logged and an alarm provided to the user of the digital device. The untrusted data may then be stored (for further analysis, for example) or deleted.

Assuming that some or all of the untrusted data is not adversely affected by malware, the processor 1104 sends the portion of unaffected data (i.e., trusted data) to the security router 1110 in step 1512. The security router 1110 may determine that the recently received data is trusted (e.g., by virtue of receiving the data from the processor 1104 of the security block 1102), and then route the trusted data to the flash memory media 1504 in step 1514. The flash memory media 1504 may then store the trusted data.

In some embodiments, the digital device 1502 retrieves data from the flash memory media 1504. The retrieved data may comprise all, some, or none of the data that was previously stored in the flash memory media 1504 in steps 1506-1514.

In step 1516, the security router receives the data (e.g., via the memory controller 1404) from the flash memory media 1504. In some embodiments, the security router 1110 determines if the data has been previously processed with instructions associated with the one or more security programs prior to storage. If the data had been previously processed with the instructions, then the security router 1110 may provide the data to the digital device 1502 without further processing. However, if the data had not been previously processed or the data was previously processed by instructions associated with out-of-date security programs (e.g., the virus definitions of an anti-virus program are not current), then the security router 1110 may provide the data to the processor 1104 for processing in step 1518.

In step 1520, the processor 1104 secures the retrieved data. In one example, the processor 1104 processes the retrieved data with instructions (i.e., associated with the security programs) loaded into the memory module 1106. the processor 1104 may send data that is not affected by malware or a hacker (e.g., trusted data) to the security router 1110 in step 1522. The security router 1110 may then route the trusted data to the digital device 1502 in step 1524.

Figure 16:
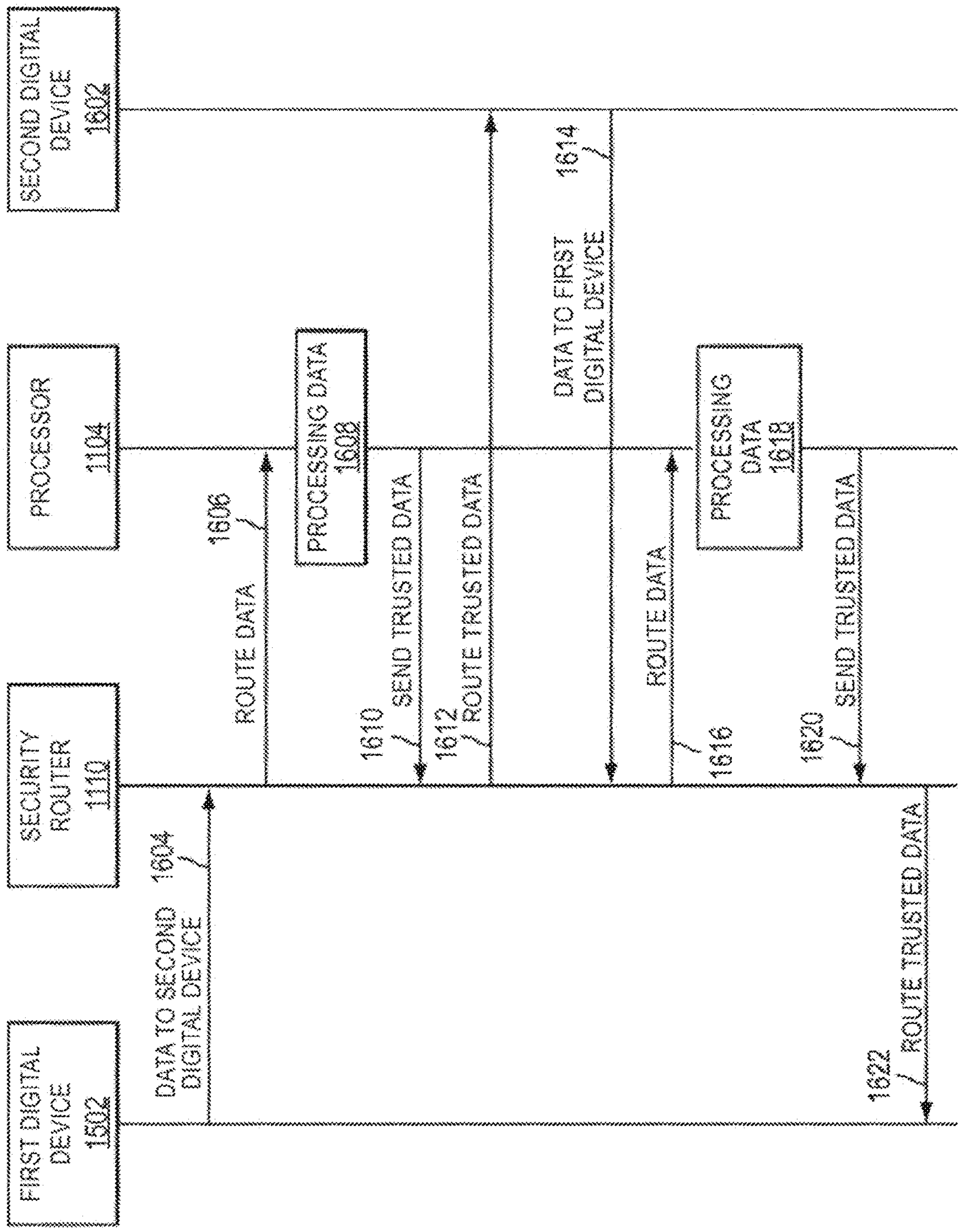
FIG. 16 is a block diagram illustrating the flow of data between two digital devices in some embodiments of the present invention.

FIG. 16 is a block diagram illustrating the flow of data between two digital devices in some embodiments of the present invention. In step 1604, the security router 1110 intercepts data from the first digital device 1502 sent to the second digital device 1602. In some embodiments, the security router 1110 may be within or coupled to the first digital device 1502, within or coupled to the second digital device 1602, or between the two devices. In an example, the security router 1110 is within a network router that routes data to and from the digital devices. In another example, the security router 1110 is within a communication chip that controls communication with the first digital device 1502 and/or the second digital device 1602.

In step 1606, the security router 1110 routes the intercepted untrusted data to the processor 1104. In some embodiments, the security router 1110 may scan data received by the security router 1110 to determine if the data has already been processed by the processor 1104. If the data has already been processed by the processor 1104, then the security router 1110 may provide the data to the second digital device 1602 without passing the data to the processor 1104.

In step 1608, the processor 1104 processes the untrusted data from the security router 1110 with instructions related to one or more security programs. If the untrusted data does not contain malware or the untrusted data is not associated with malware, a hacker, or an unauthorized user, the processor 1104 may send the trusted data back to the security router 1110 in step 1610. In one example, a malware bot resident on the first digital device 1502 may send out packets of data to probe open ports on the second digital device 1602. The security router 1110 may intercept the probe packets and provide the packets to the processor 1104 which determines that the data is either associated with a bot or related to forbidden activity (i.e., probing open ports). The processor 1104 may, for example, instruct the security router 1110 to log the event, quarantine the probe packets, and/or delete the probe packets.

In various embodiments, the processor 1104 may scan the untrusted data to determine if the intended recipient of the data is authorized to receive the data. In one example, the processor 1104 may check if the untrusted data is confidential and that the intended receiver is authorized to receive the data in order to prevent the leakage of confidential information. If the receiver is not authorized to receive the data, the data may be barred from being sent (e.g., data transmission is denied or stopped).

In some embodiments, the processor 1104 may return trusted data to the security router 1110 with an indicator, such as a flag, to indicate to the security router 1110 that the data from the processor 1104 is trusted and/or has been processed. The security router 1110 may route the trusted data to the second digital device 1602 in step 1612.

As discussed herein, in various embodiments, the same security router 1110 may intercept data sent from the first digital device 1502 to the second digital device 1602 as well as intercept data sent from the second digital device 1602 to the first digital device 1502. In step 1614, the security router 1110 intercepts untrusted data sent by the second digital device 1602 to the first digital device 1502. The security router 1110 may then route the untrusted data to the processor 1104 in step 1616.

In step 1618, the processor 1104 processes the untrusted data with the instructions associated with one or more security programs. Trusted data (e.g., data that is not affected by malware or is otherwise unrelated to malware) is sent to the security router 1110 in step 1620. The security router 1110 may then route the trusted data to the first digital device 1502 in step 1622.

Figure 17:
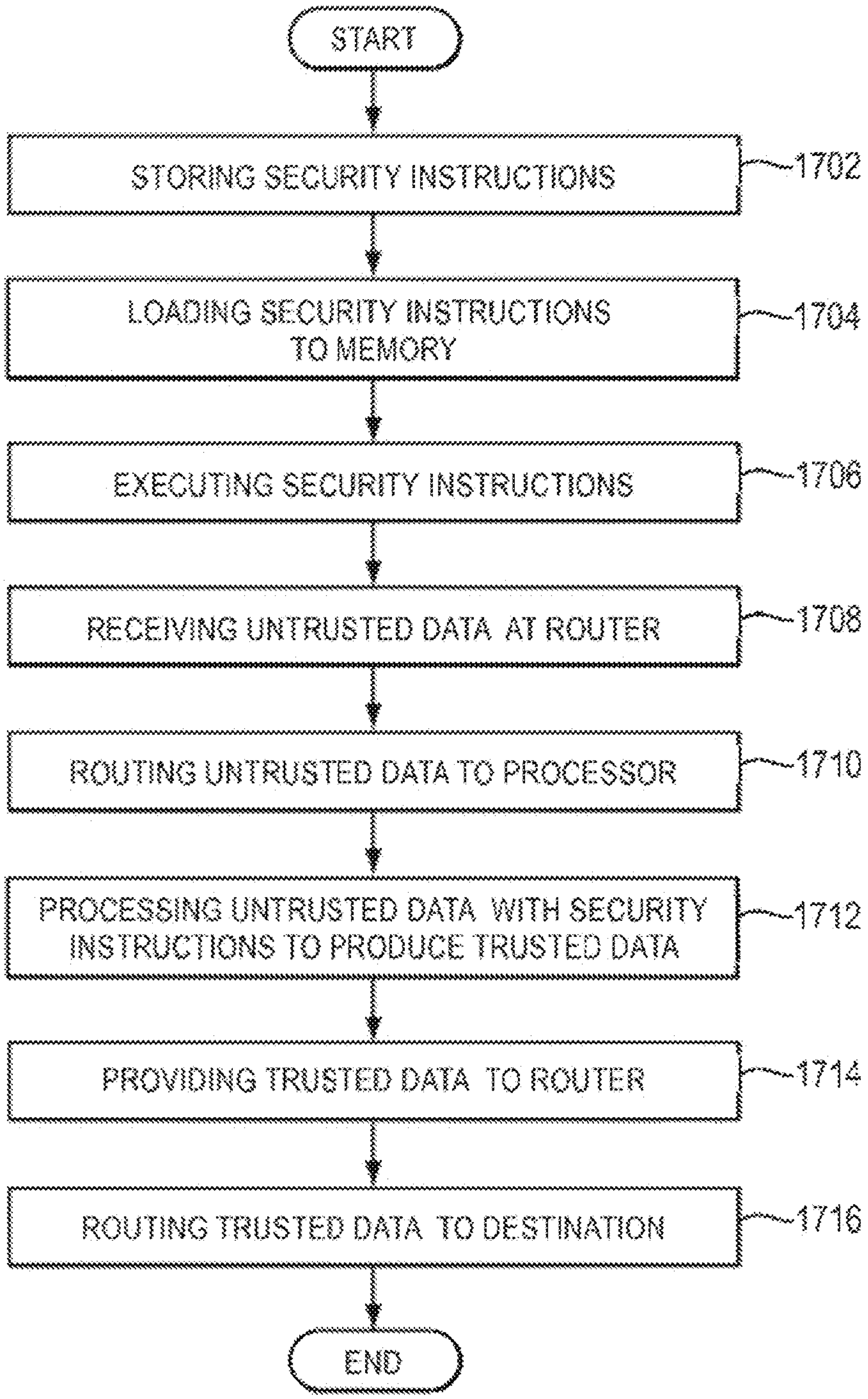
FIG. 17 is a flowchart describing the function of the security block in some embodiments of the present invention.

FIG. 17 is a flowchart describing the function of the security block 1102 in some embodiments of the present invention. In step 1702, the security block 1102 stores the security instructions. In one example, the security instructions (i.e., instructions associated with one or more security programs) are stored in the storage module 1108. The security instructions may be stored in a protected memory such that the security instructions may not be altered or corrupted by malware, a hacker, or an unauthorized user. Further, the security instructions may be protected such that they may not be altered or corrupted unintentionally by a user.

In step 1704, the security instructions are loaded from the storage into memory. In some embodiments, the security instructions are loaded from the storage module 1108 to the memory module 1106. For example, the storage module 1108 may comprise ROM and the memory module 1106 may comprise RAM.

In some embodiments, the security instructions are loaded from the protected storage module 1108 to the memory module 1106 upon startup, bootup, or reboot of the security block 1102. The security instructions may include instructions for executing one or more security programs as well as an operating system and/or any data necessary to execute the security programs. In some embodiments, all data necessary to execute the one or more security programs are loaded from protected storage to RAM so that the security instructions used to process untrusted data are not corrupted or adversely affected by malware, system error, and/or users.

In step 1706, the processor 1104 executes the security instructions. In one example, the processor 1104 boots an operating system and executes the security programs from the protected storage to prepare to receive untrusted data from the security router 1110.

In step 1708, the security router 1110 receives untrusted data. In various embodiments, the security router 1110 intercepts untrusted data between the untrusted data's source and the untrusted data's destination. The security router 1110 may receive and/or intercept data, in some examples, between two digital devices, between a processor such as a CPU and storage, or between a processor and memory. In step 1710, the security router 1110 routes the untrusted data to the processor 1104.

In step 1712, the processor 1104 processes the untrusted data to produce trusted data. In various examples, the processor 1104 executes the security instructions loaded from storage to the memory to process the untrusted data. In one example, the processor 1104 scans the untrusted data for a virus. If the untrusted data comprises a virus, the processor 1104 may, based on the security instructions for an anti-virus program, remove the virus from the untrusted data, quarantine the untrusted data, delete the untrusted data, and/or log information regarding the virus. The processor 1104 may provide the unaffected remaining data (i.e., the trusted data), if any data exists after processing, back to the security router 1110 in step 1714.

In step 1716, the security router 1110 may then route the trusted data to the data's original destination. In some embodiments, the processor 1104 may instruct the security router 1110 to take one or more actions including, but not limited to, quarantining the original untrusted data, logging information about the original untrusted data, and/or barring data received from the source of the original untrusted data.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

Further, the each term "comprising," "including," "having," "with," and "containing" is inclusive or open-ended and does not exclude additional, unrecited elements or method steps.

The invention claimed is:

1. A security system configured to provide pre-runtime security services for a mobile device while the mobile device is roaming outside of a trusted network, the security system comprising:

- a security device configured to be installed in a mobile device, the security device comprising:
  - a routing device configured to receive network data from an untrusted network, the network data being sent to be processed by the mobile device, the receiving occurring before a mobile device processor of the mobile device processes the network data;
  - a security engine including security instructions operative to perform pre-runtime security services to implement a security policy, the security instructions configured to provide in accordance with the security policy the pre-runtime security services on the network data without forcing a connection to a remote gateway, the pre-runtime security services assisting with at least one of digital rights management (DRM) services or data access services;

one or more dedicated security system processors dedicated to security functions and configured to execute the security engine, the executing causing the security engine to receive the network data from the routing device, to perform the pre-runtime security services on the network data in accordance with the security policy, and to provide the network data after performing the pre-runtime security services thereon to the routing device for transmission to the mobile device processor for processing; and dedicated storage accessible only by the one or more dedicated security system processors.

2. The security system of claim 1, further comprising a secure operating system on the security device.

3. The security system of claim 1, wherein the mobile device is a mobile phone.

4. The security system of claim 1, wherein the mobile device is a laptop computer.

5. The security system of claim 1, wherein the security engine and at least one of the one or more dedicated security system processors are incorporated in at least one chip coupled to an internal bus of the mobile device.

6. The security system of claim 1, wherein the security engine and at least one of the one or more dedicated security system processors are incorporated in a communication chip.

7. The security system of claim 1, wherein the routing device is configured in the mobile device to redirect the network data to at least one of the one or more dedicated security system processors.

8. The security system of claim 1, wherein the security policy is configured to be updated by a remote administrator.

9. A method of providing pre-runtime security services for a mobile device while the mobile device is roaming outside of a trusted network, the method comprising:

launching a security system, the security system including a security device installed in a mobile device, the security device including one or more dedicated security system processors dedicated to security functions and including dedicated storage accessible only by the one or more dedicated security system processors, the security device further including a security engine including security instructions operative to implement a security policy, the security instructions configured to provide in accordance with the security policy pre-runtime security services on the network data without forcing a connection to a remote gateway, the pre-runtime security services assisting with at least one of digital rights management (DRM) services or data access services;

executing the security engine by the one or more dedicated security system processors on the security system, the executing the security engine assisting in causing the security system to perform the following steps:

receiving, by a routing device, particular network data from the untrusted network, the particular network data being sent to be processed by the mobile device, the receiving occurring before a mobile device processor of the mobile device processes the particular network data;

using the security instructions to perform the pre-runtime security services on the particular network data in accordance with the security policy; and providing the particular network data after performing the pre-runtime security services thereon to the routing device for transmission to the mobile device processor for processing.

10. The method of claim 9, wherein the security engine and at least one of the one or more dedicated security system processors are incorporated in at least one chip coupled to an internal bus of the mobile device.

11. The method of claim 9, wherein the security engine and at least one of the dedicated security system processors are incorporated into a communication chip.

12. The method of claim 9, wherein the security device includes a secure operating system thereon.

13. A security system configured to provide pre-runtime security services for a mobile device while the mobile device is roaming outside of a trusted network, the security system comprising:

a security device configured to be installed in a mobile device, the security device comprising:

means for receiving network data from an untrusted network, the network data being sent to be processed by the mobile device, the receiving occurring before a mobile device processor of the mobile device processes the network data;

a security engine including security instructions operative to perform pre-runtime security services to implement a security policy, the security instructions configured to provide in accordance with the security policy the pre-runtime security services on the network data without forcing a connection to a remote gateway, the pre-runtime security services assisting with at least one of digital rights management (DRM) services or data access services;

one or more dedicated security system processors dedicated to security functions and configured to execute the security engine, the executing causing the security engine to receive the network data from the means for receiving network data, to perform the pre-runtime security services on the network data in accordance with the security policy, and to provide the network data after performing the pre-runtime security services thereon to the means for receiving network data for transmission to the mobile device processor for processing; and dedicated storage accessible only by the one or more dedicated security system processors.

14. A security system configured to provide pre-runtime security services for a mobile device while the mobile device is roaming outside of a trusted network, the security system comprising:

a security device configured to be installed in a mobile device, the mobile device including a mobile device processor, the security device comprising:

one or more dedicated security system processors dedicated to security functions;

dedicated storage accessible only by the one or more dedicated security system processors;

a security engine including security instructions operative to implement a security policy when executed by the one or more dedicated security system processors, the security instructions configured to provide in accordance with the security policy pre-runtime security services on the network data in accordance with the security policy without forcing a connection to a remote gateway, the pre-runtime security services assisting with at least one of digital rights management (DRM) services or data access services; and a routing device configured to receive particular network data from an untrusted network before the mobile device processor of the mobile device processes the particular network data, the particular network data being sent to be processed by the mobile device, the receiving occurring before the mobile device processor processes the particular network data, the routing device further configured to forward the particular network data to the security engine, the routing device still further configured to forward particular return network data received from the security engine to the mobile device for processing by the mobile device processor;

the one or more dedicated security system processors configured to execute the security engine, thereby causing the security engine to:

receive the particular network data from the routing device, perform the pre-runtime security services on the particular network data in accordance with the security policy to generate the particular return network data, and provide the particular return network data to the routing device for transmission to the mobile device for processing by the mobile device processor.

* * * * *